United States Patent
Peng

(10) Patent No.: US 10,097,322 B2
(45) Date of Patent: Oct. 9, 2018

(54) COORDINATED TRANSMISSION METHOD AND DEVICE

(71) Applicant: HUAWEI TECHNOLOGIES CO., LTD., Shenzhen, Guangdong (CN)

(72) Inventor: Yan Peng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/618,499

(22) Filed: Feb. 10, 2015

(65) Prior Publication Data

US 2015/0155984 A1    Jun. 4, 2015

Related U.S. Application Data

(63) Continuation of application No. PCT/CN2012/080037, filed on Aug. 13, 2012.

(51) Int. Cl.
| | |
|---|---|
| H04L 5/00 | (2006.01) |
| H04W 56/00 | (2009.01) |
| H04W 16/32 | (2009.01) |
| H04J 11/00 | (2006.01) |
| H04W 16/02 | (2009.01) |
| H04W 88/02 | (2009.01) |

(52) U.S. Cl.
CPC ........ *H04L 5/0035* (2013.01); *H04J 11/0053* (2013.01); *H04L 5/0051* (2013.01); *H04W 16/02* (2013.01); *H04W 16/32* (2013.01); *H04W 56/001* (2013.01); *H04W 88/02* (2013.01)

(58) Field of Classification Search
None
See application file for complete search history.

(56) References Cited

U.S. PATENT DOCUMENTS

2002/0154621 A1* 10/2002 Laroia .................. H04B 7/2643
                                                370/330
2005/0174985 A1*  8/2005 Lee ....................... H04W 28/06
                                                370/349

(Continued)

FOREIGN PATENT DOCUMENTS

| CN | 101790171 | 7/2010 |
|---|---|---|
| CN | 102045830 | 5/2011 |

(Continued)

OTHER PUBLICATIONS

Japanese Office Action dated Jan. 19, 2016 in corresponding Japanese Patent Application No. 2015-526848.

(Continued)

*Primary Examiner* — Kevin C Harper
*Assistant Examiner* — Derrick V Rose
(74) *Attorney, Agent, or Firm* — Womble Bond Dickinson (US) LLP

(57) ABSTRACT

Embodiments of the present invention provide a coordinated transmission method and a device. The method includes: communicating, by a UE, with a macro base station in a subframe in a first subframe set; and communicating, by the UE, with a micro base station in a subframe in a second subframe set; where the subframe in the first subframe set and the subframe in the second subframe set do not overlap. Technical solutions of the present invention solve a problem that application of a CoMP transmission technology is limited.

17 Claims, 3 Drawing Sheets

(56) References Cited

U.S. PATENT DOCUMENTS

| | | | | |
|---|---|---|---|---|
| 2006/0280141 | A1* | 12/2006 | McBeath | H04L 29/12839 370/329 |
| 2008/0056172 | A1* | 3/2008 | Nakatsugawa | H04B 7/15542 370/315 |
| 2009/0196275 | A1* | 8/2009 | Damnjanovic | H04W 28/06 370/345 |
| 2009/0280798 | A1* | 11/2009 | Meylan | H04W 72/1284 455/422.1 |
| 2010/0172267 | A1 | 7/2010 | Viorel et al. | |
| 2010/0177746 | A1 | 7/2010 | Gorokhov et al. | |
| 2011/0249584 | A1* | 10/2011 | Barbieri | H04L 1/0026 370/252 |
| 2012/0106374 | A1 | 5/2012 | Gaal et al. | |
| 2012/0165034 | A1 | 6/2012 | Boudreau et al. | |
| 2013/0114562 | A1* | 5/2013 | Seo | H04W 52/146 370/329 |
| 2013/0170406 | A1 | 7/2013 | Kishiyama | |
| 2013/0242897 | A1* | 9/2013 | Meylan | H04W 28/16 370/329 |
| 2015/0016371 | A1* | 1/2015 | Lee | H04J 11/0053 370/329 |

FOREIGN PATENT DOCUMENTS

| | | |
|---|---|---|
| CN | 102387598 | 3/2012 |
| JP | 2001-345820 | 12/2001 |
| JP | 2010-161771 | 7/2010 |
| JP | 2012-54711 | 3/2012 |
| WO | 2011/155256 A1 | 12/2011 |
| WO | 2012008773 A2 | 1/2012 |
| WO | 2012/082023 A1 | 6/2012 |
| WO | 2012/085637 A1 | 6/2012 |

OTHER PUBLICATIONS

"CoMP deployment and the X2 interface", 3GPP TSG-RAN WG1 Meeting #66bis, Zhuhai, China, Oct. 10-14, 2011, R1-113478, 2 pages.

"Practical constraints of the communication link between transmission points", 3GPP TSG-RAN WG1 #63bis, Dublin, Ireland, Jan. 17-21, 2011, R1-110234, pp. 1-6.

PCT International Search Report dated Apr. 25, 2013 in corresponding International Patent Application No. PCT/CN2012/080037.

Extended European Search Report dated Jun. 5, 2015 in corresponding European Patent Application No. 12882987.6.

"3$^{rd}$ Generation Partnership Project; Technical Specification Group Radio Access Network; Evolved Universal Terrestrial Radio Access (E-UTRA); Study on signaling and procedure for interference avoidance for in-device coexistence (Release 11)", 3GPP TR 36.816 V11.2.0, Dec. 2011, pp. 1-44.

International Search Report dated Apr. 25, 2013, in corresponding International Patent Application No. PCT/CN2012/080037.

3GPP TS 36.413 V10.5.0 (Mar. 2012),3rd Generation Partnership Project;Technical Specification Group Radio Access Network;Evolved Universal Terrestrial Radio Access Network(E-UTRAN);S1 Application Protocol (S1AP)(Release 10), total 255 pages.

* cited by examiner

COORDINATED TRANSMISSION METHOD AND DEVICE

CROSS-REFERENCE TO RELATED APPLICATIONS

This application is a continuation of International Application No. PCT/CN2012/080037, filed on Aug. 13, 2012, which is hereby incorporated by reference in its entirety.

TECHNICAL FIELD

The present invention relates to communications technologies, and in particular, to a coordinated transmission method and a device.

BACKGROUND

While networks are evolving towards broadband and mobile access, the 3rd generation partnership program (3GPP) organization proposes a long term evolution (LTE) solution in Release 8, and proposes a long term evolution-advanced (LTE-Advanced) solution in subsequent Release 10, to address aspects of mobile access networks. The coordinated multipoint (CoMP) transmission technology is one key focus of the research on LTE-Advanced. Currently, the CoMP technology mainly has four application scenarios (Scenario), where scenario 1 and scenario 2 are coordinated multipoint transmission between macro cells in a homogeneous network (Homnet), and scenario 3 and scenario 4 are coordinated multipoint transmission between a macro cell and a micro cell in a heterogeneous network (Hetnet).

In the CoMP transmission technology, different transmit sources may transmit same information, for example, different transmit sources transmit a same physical broadcast channel (PBCH) or physical downlink control channel (PDSCH); or may transmit matched information, for example, different transmit sources respectively transmit a PDCCH and a physical downlink shared channel (PDSCH). This requires that different transmit sources can share a context of a same user equipment (UE) in real time, that is, it is required that different transmit sources communicate with each other within the context of the UE. In which case, a delay in communication between different transmit sources has to be reduced to microseconds (μs). However, at present, the foregoing delay requirement can only be met by interconnecting different transmit sources by means of optical fibers or high-speed microwaves. As is known to all, the practice of interconnecting by means of optical fibers or high-speed microwaves is costly, which hinders the use of the CoMP transmission technology.

SUMMARY

Embodiments of the present invention provide a coordinated transmission method and a device, which are used to solve a problem that application of a CoMP transmission technology is limited.

A first aspect of the embodiments of the present invention provides a coordinated transmission method, including:
communicating, by a user equipment UE, with a macro base station in a subframe in a first subframe set; and
communicating, by the UE, with a micro base station in a subframe in a second subframe set; where
the subframe in the first subframe set and the subframe in the second subframe set do not overlap.

In an optional implementation of the first aspect, before the communicating, by a user equipment UE, with a macro base station in a subframe in a first subframe set, the method includes: determining, by the UE, a downlink subframe in the first subframe set, where the downlink subframe in the first subframe set meet that, if a downlink subframe n belongs to the first subframe set, a downlink subframe (n+8) also belongs to the first subframe set.

In an optional implementation of the first aspect, before the communicating, by a user equipment UE, with a macro base station in a subframe in a first subframe set, the method further includes: determining, by the UE, a uplink subframe in the first subframe set, where the uplink subframe in the first subframe set meet that, if a downlink subframe n belongs to the first subframe set, an uplink subframe (n+4) belongs to the first subframe set.

In an optional implementation of the first aspect, before the communicating, by the UE, with a micro base station in a subframe in a second subframe set, the method includes: determining, by the UE, a downlink subframe in the second subframe set, where the downlink subframe in the second subframe set meet that, if a downlink subframe m belongs to the second subframe set, a downlink subframe (m+8) also belongs to the second subframe set.

In an optional implementation of the first aspect, before the communicating, by the UE, with a micro base station in a subframe in a second subframe set, the method further includes: determining, by the UE, a uplink subframe in the second subframe set, where the uplink subframe in the second subframe set meet that, if a downlink subframe m belongs to the second subframe set, an uplink subframe (m+4) belongs to the second subframe set.

In an optional implementation of the first aspect, the UE communicates in the downlink with the macro base station in the downlink subframe in the first subframe set.

In an optional implementation of the first aspect, that communicating, by the UE, in the downlink with the macro base station in the downlink subframe in the first subframe set includes any one of the following operations or a combination thereof:
receiving, by the UE in the downlink subframe in the first subframe set, a CRS and a channel demodulated based on the CRS that are sent by the macro base station;
receiving, by the UE in the downlink subframe in the first subframe set, a PSS sent by the macro base station; and
receiving, by the UE in the downlink subframe in the first subframe set, an SSS sent by the macro base station; and
receiving, by the UE in the downlink subframe in the first subframe set, an ePDCCH that is demodulated based on a DMRS and sent by the macro base station.

In an optional implementation of the first aspect, the UE communicates in the uplink with the macro base station in the uplink subframe in the first subframe set.

In an optional implementation of the first aspect, before the UE communicates in the uplink with the macro base station in the uplink subframe in the first subframe set, the method includes: receiving, by the UE, a first association relationship sent by the macro base station or the micro base station, where the first association relationship includes an identifier of a logical channel associated with the first subframe set; and
communicating, by the UE, in the uplink with the macro base station in the subframe in the first subframe set includes: sending, by the UE in the uplink subframe in the first subframe set according to the first association relationship, data on a radio bearer corresponding to the identifier of the logical channel in the first association relationship to the macro base station.

In an optional implementation of the first aspect, the UE communicates in the downlink with the micro base station in the downlink subframe in the second subframe set.

In an optional implementation of the first aspect, communicating, by the UE, in the downlink with the micro base station in the downlink subframe in the second subframe set includes any one of the following operations or a combination thereof:

receiving, by the UE in the downlink subframe in the second subframe set, a CSI-RS sent by the micro base station; and receiving, by the UE in the downlink subframe in the second subframe set, a DMRS and a channel demodulated based on the DMRS that are sent by the micro base station.

In an optional implementation of the first aspect, the UE communicates in the uplink with the micro base station in the uplink subframe in the second subframe set.

In an optional implementation of the first aspect, before the UE communicates in the uplink with the micro base station in the uplink subframe in the second subframe set, the method includes: receiving, by the UE, a second association relationship sent by the macro base station or the micro base station, where the second association relationship includes an identifier of a logical channel associated with the second subframe set; and communicating, by the UE, in the uplink with the micro base station in the subframe in the second subframe set includes: sending, by the UE in the uplink subframe in the second subframe set according to the second association relationship, data on a radio bearer corresponding to the identifier of the logical channel in the second association relationship to the micro base station.

In an optional implementation of the first aspect, before the UE communicates with the macro base station in the subframe in the first subframe set and communicates with the micro base station subframe in the subframe in the second subframe set, the method includes: receiving, by the UE, a configuration of the first subframe set and/or a configuration of the second subframe set sent by the macro base station or the micro base station, so as to distinguish between the first subframe set and the second subframe set.

In an optional implementation of the first aspect, before the communicating, by a macro base station, with a user equipment UE in a subframe in a first subframe set, the method includes: receiving, by the UE, a first physical layer parameter configuration sent by the macro base station or the micro base station; and the communicating, by a user equipment UE, with a macro base station in a subframe in a first subframe set includes: communicating, by the UE, with the macro base station in the subframe in the first subframe set according to the first physical layer parameter configuration.

In an optional implementation of the first aspect, before the communicating, by the UE, with a micro base station in a subframe in a second subframe set, the method includes: receiving, by the UE, a second physical layer parameter configuration sent by the macro base station or the micro base station; and the communicating, by the UE, with a micro base station in a subframe in a second subframe set includes: communicating, by the UE, with the micro base station in the subframe in the second subframe set according to the second physical layer parameter configuration.

A second aspect of the embodiments of the present invention provides a coordinated transmission method, including:

communicating, by a macro base station, with a user equipment UE in a subframe in a first subframe set, where the UE further communicates with a micro base station in a subframe in a second subframe set, where the subframe in the first subframe set and the subframe in the second subframe set do not overlap.

In an optional implementation of the second aspect, before the communicating, by a macro base station, with a user equipment UE in a subframe in a first subframe set, the method includes: sending, by the macro base station, the first subframe set and/or the second subframe set to the micro base station, so that the micro base station acquires the second subframe set.

In an optional implementation of the second aspect, before the communicating, by a macro base station, with a user equipment UE in a subframe in a first subframe set, the method includes: sending, by the macro base station, a HARQ process identifier set that is used by the macro base station and corresponds to the UE and/or a HARQ process identifier set that is used by the micro base station and corresponds to the UE to the micro base station, so that the micro base station acquires the HARQ process identifier set that is used by the micro base station and corresponds to the UE.

In an optional implementation of the second aspect, before the communicating, by a macro base station, with a user equipment UE in a subframe in a first subframe set, the method includes: sending, by the macro base station to the UE, a first physical layer parameter configuration and a second physical layer parameter configuration respectively corresponding to the first subframe set and the second subframe set.

In an optional implementation of the second aspect, before the sending, by the macro base station to the UE, a first physical layer parameter configuration and a second physical layer parameter configuration respectively corresponding to the first subframe set and the second subframe set, the method includes: determining, by the macro base station, the first physical layer parameter configuration; and receiving the second physical layer parameter configuration sent by the micro base station.

In an optional implementation of the second aspect, before the sending, by the macro base station to the UE, a first physical layer parameter configuration and a second physical layer parameter configuration respectively corresponding to the first subframe set and the second subframe set, the method includes: determining, by the macro base station, the first physical layer parameter configuration and the second physical layer parameter configuration separately; and the coordinated transmission method further includes: sending, by the macro base station, the second physical layer parameter configuration to the micro base station.

In an optional implementation of the second aspect, the macro base station communicates in the downlink with the UE in the downlink subframe in the first subframe set.

In an optional implementation of the second aspect, the communicating, by the macro base station, in the downlink with the UE in the downlink subframe in the first subframe set includes any one of the following operations or a combination thereof:

sending, by the macro base station in the downlink subframe in the first subframe set, a CRS and a channel demodulated based on the CRS to the UE;

sending, by the macro base station in the downlink subframe in the first subframe set, a PSS to the UE;

sending, by the macro base station in the downlink subframe in the first subframe set, an SSS to the UE; and sending, by the macro base station in the downlink subframe in the first subframe set, an ePDCCH demodulated based on a DMRS to the UE.

In an optional implementation of the second aspect, the macro base station communicates in the uplink with the UE in an uplink subframe in the first subframe set.

In an optional implementation of the second aspect, before the macro base station communicates in the uplink with the UE in an uplink subframe in the first subframe set, the method includes: sending, by the macro base station, a first association relationship to the UE, where the first association relationship includes an identifier of a logical channel associated with the first subframe set; and the communicating, by the macro base station, in the uplink with the UE in an uplink subframe in the first subframe set includes: receiving, by the macro base station in the uplink subframe in the first subframe set, data, sent by the UE, on a radio bearer corresponding to the identifier of the logical channel in the first association relationship.

In an optional implementation of the second aspect, the method further includes: sending, by the macro base station, a second association relationship to the UE, where the second association relationship includes an identifier of a logical channel associated with the second subframe set, so that the UE sends, in the uplink subframe in the second subframe set, data on a radio bearer corresponding to the identifier of the logical channel in the second association relationship to the micro base station.

In an optional implementation of the second aspect, before the communicating, by a macro base station, with a user equipment UE in a subframe in a first subframe set, the method includes: sending, by the macro base station, a configuration of the first subframe set and/or a configuration of the second subframe set to the UE, so that the UE distinguishes between the first subframe set and the second subframe set.

A third aspect of the embodiments of the present invention provides a coordinated transmission method, including:

communicating, by a micro base station, with a user equipment UE in a subframe in a second subframe set, where the UE further communicates with a macro base station in a subframe in a first subframe set, where the subframe in the first subframe set and the subframe in the second subframe set do not overlap.

In an optional implementation of the third aspect, before the communicating, by a micro base station, with a user equipment UE in a subframe in a second subframe set, the method includes: receiving, by the micro base station, the first subframe set and/or the second subframe set sent by the macro base station, so as to acquire the second subframe set.

In an optional implementation of the third aspect, before the communicating, by a micro base station, with a user equipment UE in a subframe in a second subframe set, the method includes: receiving, by the micro base station, a HARQ process identifier set that is used by the macro base station and corresponds to the UE and/or a HARQ process identifier set that is used by the micro base station and corresponds to the UE, which are/is sent by the macro base station, so as to acquire the HARQ process identifier set that is used by the micro base station and corresponds to the UE.

In an optional implementation of the third aspect, before the communicating, by a micro base station, with a user equipment UE in a subframe in a second subframe set, the method includes: sending, by the micro base station to the UE, a first physical layer parameter configuration and a second physical layer parameter configuration respectively corresponding to the first subframe set and the second subframe set.

In an optional implementation of the third aspect, before the sending, by the micro base station to the UE, a first physical layer parameter configuration and a second physical layer parameter configuration respectively corresponding to the first subframe set and the second subframe set, the method includes: determining, by the micro base station, the second physical layer parameter configuration; and receiving the first physical layer parameter configuration sent by the macro base station.

In an optional implementation of the third aspect, before the sending, by the macro base station to the UE, a first physical layer parameter configuration and a second physical layer parameter configuration respectively corresponding to the first subframe set and the second subframe set, the method includes: determining, by the micro base station, the first physical layer parameter configuration and the second physical layer parameter configuration separately; and the coordinated transmission method further includes: sending, by the micro base station, the first physical layer parameter configuration to the macro base station.

In an optional implementation of the third aspect, the micro base station communicates in the downlink with the UE in a downlink subframe in the second subframe set.

In an optional implementation of the third aspect, the communicating, by the micro base station, in the downlink with the UE in a downlink subframe in the second subframe set includes any one of the following operations or a combination thereof:

sending, by the micro base station in the downlink subframe in the second subframe set, a CSI-RS to the UE; and sending, by the micro base station in the downlink subframe in the second subframe set, a DMRS and a channel demodulated based on the DMRS to the UE.

In an optional implementation of the third aspect, the micro base station communicates in the uplink with the UE in an uplink subframe in the second subframe set.

In an optional implementation of the third aspect, before the micro base station communicates in the uplink with the UE in an uplink subframe in the second subframe set, the method includes: sending, by the micro base station, a second association relationship to the UE, where the second association relationship includes an identifier of a logical channel associated with the second subframe set; and the communicating, by the micro base station, in the uplink with the UE in an uplink subframe in the second subframe set includes: receiving, by the micro base station in the uplink subframe in the second subframe set, data, sent by the UE, on a radio bearer corresponding to the identifier of the logical channel in the second association relationship.

In an optional implementation of the third aspect, the method further includes: sending, by the micro base station, a first association relationship to the UE, where the first association relationship includes an identifier of a logical channel associated with the first subframe set, so that the UE sends, in the uplink subframe in the first subframe set, data on a radio bearer corresponding to the identifier of the logical channel in the first association relationship to the macro base station.

In an optional implementation of the third aspect, before the communicating, by a micro base station, with a user equipment UE in subframes in a second subframe set, the method includes: sending, by the micro base station, a configuration of the first subframe set and/or a configuration of the second subframe set to the UE, so that the UE distinguishes between the first subframe set and the second subframe set.

A fourth aspect of the embodiments of the present invention provides a user equipment, including:

a first communication unit, configured to communicate with a macro base station in a subframe in a first subframe set; and a second communication unit, configured to communicate with a micro base station in a subframe in a second subframe set; where the subframe in the first subframe set and the subframe in the second subframe set do not overlap.

In an optional implementation of the fourth aspect, the user equipment further includes: a first determining unit, configured to determine a downlink subframe in the first subframe set, where the downlink subframe in the first subframe set meet that, if a downlink subframe n belongs to the first subframe set, a downlink subframe (n+8) also belongs to the first subframe set.

In an optional implementation of the fourth aspect, the first determining unit is further configured to determine an uplink subframe in the first subframe set, where the uplink subframe in the first subframe set meet that, if a downlink subframe n belongs to the first subframe set, an uplink subframe (n+4) belongs to the first subframe set.

In an optional implementation of the fourth aspect, the user equipment further includes: a second determining unit, configured to determine a downlink subframe in the second subframe set, where the downlink subframe in the second subframe set meet that, if a downlink subframe m belongs to the second subframe set, a downlink subframe (m+8) also belongs to the second subframe set.

In an optional implementation of the fourth aspect, the second determining unit is further configured to determine an uplink subframe in the second subframe set, where the uplink subframe in the second subframe set meet that, if a downlink subframe m belongs to the first subframe set, an uplink subframe (m+4) belongs to the second subframe set.

In an optional implementation of the fourth aspect, the first communication unit is specifically configured to communicate in the downlink with the macro base station in the downlink subframe in the first subframe set.

In an optional implementation of the fourth aspect, that the first communication unit communicate in the downlink with the macro base station in the downlink subframe in the first subframe set includes that: the first communication unit is specifically configured to execute any one of the following operations or a combination thereof:

the first communication unit is specifically configured to receive, in the downlink subframe in the first subframe set, a CRS and a channel demodulated based on the CRS that are sent by the macro base station;

the first communication unit is specifically configured to receive, in the downlink subframe in the first subframe set, a PSS sent by the macro base station;

the first communication unit is specifically configured to receive, in the downlink subframe in the first subframe set, an SSS sent by the macro base station; and the first communication unit is specifically configured to receive, in the downlink subframe in the first subframe set, an ePDCCH that is demodulated based on a DMRS and sent by the macro base station.

In an optional implementation of the fourth aspect, the first communication unit is specifically configured to communicate in the uplink with the macro base station in the uplink subframe in the first subframe set.

In an optional implementation of the fourth aspect, the user equipment further includes: a first receiving unit, configured to receive a first association relationship sent by the macro base station or the micro base station, where the first association relationship includes an identifier of a logical channel associated with the first subframe set; and the first communication unit is specifically configured to send, in the uplink subframe in the first subframe set according to the first association relationship received by first receiving unit, data on a radio bearer corresponding to the logical channel in the first association relationship to the macro base station.

In an optional implementation of the fourth aspect, the second communication unit is specifically configured to communicate in the downlink with the micro base station in the downlink subframe in the second subframe set.

In an optional implementation of the fourth aspect, that the second communication unit is specifically configured to communicate in the downlink with the micro base station in the downlink subframe in the second subframe set includes that: the second communication unit is specifically configured to execute any one of the following operations or a combination thereof:

the second communication unit is specifically configured to receive, in the downlink subframe in the second subframe set, a CSI-RS sent by the micro base station; and the second communication unit is specifically configured to receive, in the downlink subframe in the second subframe set, a DMRS and a channel demodulated based on the DMRS that are sent by the micro base station.

In an optional implementation of the fourth aspect, the second communication unit is specifically configured to communicate in the uplink with the micro base station in the uplink subframe in the second subframe set.

In an optional implementation of the fourth aspect, the user equipment further includes: a second receiving unit, configured to receive a second association relationship sent by the macro base station or the micro base station, where the second association relationship includes an identifier of a logical channel associated with the second subframe set; and the second communication unit is specifically configured to send, in the uplink subframe in the second subframe set according to the second association relationship, data on a radio bearer corresponding to the identifier of the logical channel in the second association relationship to the micro base station.

In an optional implementation of the fourth aspect, the user equipment further includes: a third receiving unit, configured to receive a configuration of the first subframe set and/or a configuration of the second subframe set sent by the macro base station or the micro base station, so as to distinguish between the first subframe set and the second subframe set.

In an optional implementation of the fourth aspect, the user equipment further includes: a fourth receiving unit, configured to receive a first physical layer parameter configuration sent by the macro base station or the micro base station, where the first communication unit is specifically configured to communicate with the macro base station in the subframe in the first subframe set according to the first physical layer parameter configuration.

In an optional implementation of the fourth aspect, the fourth receiving unit is further configured to receive a second physical layer parameter configuration sent by the macro base station or the micro base station, where the second communication unit is specifically configured to communicate with the micro base station in the subframe in the second subframe set according to the second physical layer parameter configuration.

A fifth aspect of the embodiments of the present invention provides a macro base station, including:

a third communication unit, configured to communicate with a user equipment UE in a subframe in a first subframe set, where the UE further communicates with a micro base station in a subframe in a second subframe set, where the subframe in the first subframe set and the subframe in the second subframe set do not overlap.

In an optional implementation of the fifth aspect, the macro base station further includes: a second acquiring unit, configured to separately determine the first physical layer parameter configuration and the second physical layer parameter configuration before the third sending unit sends the first physical layer parameter configuration and the second physical layer parameter configuration to the UE; where the third sending unit is further configured to send the second physical layer parameter configuration to the micro base station.

In an optional implementation of the fifth aspect, the third communication unit is specifically configured to communicate in the downlink with the UE in a downlink subframe in the first subframe set.

In an optional implementation of the fifth aspect, that the third communication unit is specifically configured to communicate in the downlink with the UE in the downlink subframe in the first subframe set includes that: the third communication unit is specifically configured to execute any one of the following operations or a combination thereof:

the third communication unit is specifically configured to send, in the downlink subframe in the first subframe set, a CRS and a channel demodulated based on the CRS to the UE;

the third communication unit is specifically configured to send, in the downlink subframe in the first subframe set, a PSS to the UE;

the third communication unit is specifically configured to send, in the downlink subframe in the first subframe set, an SSS to the UE; and the third communication unit is specifically configured to send, in the downlink subframe in the first subframe set, an ePDCCH demodulated based on a DMRS to the UE.

In an optional implementation of the fifth aspect, the third communication unit is specifically configured to communicate in the uplink with the UE in an uplink subframe in the first subframe set.

In an optional implementation of the fifth aspect, the macro base station further includes: a fourth sending unit, configured to send a first association relationship to the UE, where the first association relationship includes an identifier of a logical channel associated with the first subframe set; and the third communication unit is specifically configured to receive, in the uplink subframe in the first subframe set, data, sent by the UE, on a radio bearer corresponding to the identifier of the logical channel in the first association relationship.

In an optional implementation of the fifth aspect, the fourth sending unit is further configured to send a second association relationship to the UE, where the second association relationship includes an identifier of a logical channel associated with the second subframe set, so that the UE sends, in the uplink subframe in the second subframe set, data on a radio bearer corresponding to the identifier of the logical channel in the second association relationship to the micro base station.

In an optional implementation of the fifth aspect, the macro base station further includes: a fifth sending unit, configured to send, before the third communication unit communicates with the UE in the subframe in the first subframe set, a configuration of the first subframe set and/or a configuration of the second subframe set to the UE, so that the UE distinguishes between the first subframe set and the second subframe set.

A sixth aspect of the embodiments of the present invention provides a micro base station, including:

a fourth communication unit, configured to communicate with a user equipment UE in a subframe in a second subframe set, where the UE further communicates with a macro base station in a subframe in a first subframe set, where the subframe in the first subframe set and the subframe in the second subframe set do not overlap.

In an optional implementation of the sixth aspect, the micro base station further includes: a fifth receiving unit, configured to receive the first subframe set and/or the second subframe set sent by the macro base station, so as to acquire the second subframe set.

In an optional implementation of the sixth aspect, the micro base station further includes: a sixth receiving unit, configured to receive a HARQ process identifier set that is used by the macro base station and corresponds to the UE and/or a HARQ process identifier set that is used by the micro base station and corresponds to the UE, which are/is sent by the macro base station, so as to acquire the HARQ process identifier set that is used by the micro base station and corresponds to the UE.

In an optional implementation of the sixth aspect, the micro base station further includes: a sixth sending unit, configured to send a first physical layer parameter configuration and a second physical layer parameter configuration respectively corresponding to the first subframe set and the second subframe set to the UE.

In an optional implementation of the sixth aspect, the micro base station further includes: a third acquiring unit, configured to, before the sixth sending unit sends the first physical layer parameter configuration and the second physical layer parameter configuration to the UE, determine the second physical layer parameter configuration, and receive the first physical layer parameter configuration sent by the macro base station.

In an optional implementation of the sixth aspect, the micro base station further includes: a fourth acquiring unit, configured to separately determine the first physical layer parameter configuration and the second physical layer parameter configuration before the sixth sending unit sends the first physical layer parameter configuration and the second physical layer parameter configuration to the UE; where the sixth sending unit is further configured to send the first physical layer parameter configuration to the macro base station.

In an optional implementation of the sixth aspect, the fourth communication unit is specifically configured to communicate in the downlink with the UE in a downlink subframe in the second subframe set.

In an optional implementation of the sixth aspect, that the fourth communication unit is specifically configured to communicate in the downlink with the UE in a downlink subframe in the second subframe set includes that: the fourth communication unit is specifically configured to execute any one of the following operations or a combination thereof:

the fourth communication unit is specifically configured to send a CSI-RS to the UE in the downlink subframe in the second subframe set; and the fourth communication unit is specifically configured to send a DMRS and a channel demodulated based on the DMRS to the UE in the downlink subframe in the second subframe set.

In an optional implementation of the sixth aspect, the fourth communication unit is specifically configured to communicate in the uplink with the UE in an uplink subframe in the second subframe set.

In an optional implementation of the sixth aspect, the micro base station further includes: a seventh sending unit, configured to send a second association relationship to the UE, where the second association relationship includes an identifier of a logical channel associated with the second subframe set; and the fourth communication unit is specifically configured to receive, in the uplink subframe in the second subframe set, data, sent by the UE, on a radio bearer corresponding to the identifier of the logical channel in the second association relationship.

In an optional implementation of the sixth aspect, the seventh sending unit is further configured to send a first association relationship to the UE, where the first association relationship includes an identifier of a logical channel associated with the first subframe set, so that the UE sends, in the uplink subframe in the first subframe set, data on a radio bearer corresponding to the identifier of the logical channel in the first association relationship to the macro base station.

In an optional implementation of the sixth aspect, the micro base station further includes: an eighth sending unit, configured to send, before the fourth communication unit communicates with the UE in the subframe in the second subframe set, a configuration of the first subframe set and/or a configuration of the second subframe set to the UE, so that the UE distinguishes between the first subframe set and the second subframe set.

In the coordinated transmission method and the device according to the embodiments of the present invention, a UE separately communicate with a macro base station and a micro base station in a time division multiplexing, so that the macro base station and the micro base station do not need to share a context of the UE in real time, which lowers a requirement on a communication delay between transmit sources. In this way, an interconnection between the macro base station and the micro base station is no longer limited, thereby expanding application scenarios and scopes of a coordinated transmission technology.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1A:
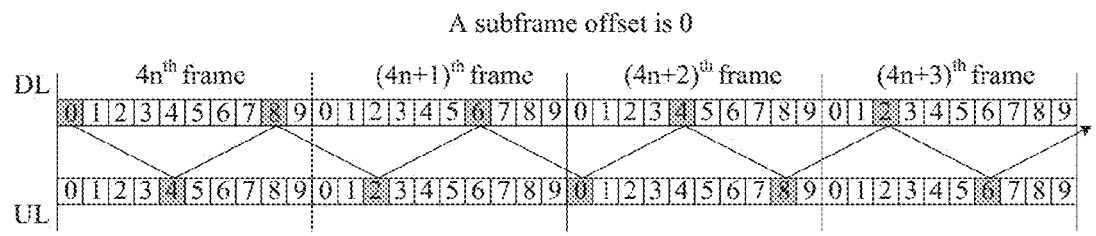
FIG. 1A and FIG. 1B are uplink and downlink subframes in a first subframe set illustrated in an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

The CoMP transmission technology exhibits many advantages. However, in the prior art, different transmit sources have to be interconnected by means of optical fibers or high-speed microwaves, to ensure that a communication delay between different transmit sources is low enough for real-time sharing of a context of a same UE by different transmit sources. The practice of interconnecting by optical fibers or high-speed microwaves is costly and hard-to-implement, and consequently hinders the use of the CoMP transmission technology. To break through the bottleneck in the use of the CoMP transmission technology, the embodiments of the present invention provide a coordinated transmission method, which takes full advantage of the CoMP transmission technology.

An embodiment of the present invention provides a coordinated transmission method, including: communicating, by a UE, communication with a macro base station in a subframe in a first subframe set; and communicating, by the UE, with a micro base station in a subframe in a second subframe set, where the subframe in the first subframe set and the subframe in the second subframe set do not overlap, which then means that the UE separately communicates with the macro base station and the micro base station in a time division multiplexing manner.

The method according to this embodiment of the present invention may be applied to a heterogeneous network, and may also be applied to a scenario in a homogeneous network in which coverage of a macro base station and that of a micro base station overlap. More specifically, the UE of this embodiment is located in both coverage of the macro base station and that of the micro base station, and separately communicates with the macro base station and the micro base station in a time division multiplexing manner, which is different from a communication manner used when the UE is only in coverage of a macro base station or that of a micro base station; and is also different from a communication manner used when the UE is located in both coverage of a macro base station and that of a micro base station, but the macro base station and the micro base station send a same control signal to the UE at the same time, and the UE combines the two control signals. The macro base station in this embodiment may be, but is not limited to a base station (eNB) in the fourth application scenario of CoMP. The micro base station in this embodiment may be a low power node (LPN), such as a remote radio head (RRH), in the fourth scenario of CoMP.

In this embodiment, a UE separately communicates with a macro base station and a micro base station in a time division multiplexing manner, and a context of the UE is separately created on the macro base station and the micro base station, so that the macro base station and the micro base station do not need to share a context of the UE in real time, which lowers a requirement on a communication delay of a backhaul link between the macro base station and the micro base station. In this way, the macro base station and the micro base station are not required to be interconnected by means of optical fibers or high-speed microwaves. The coordinated transmission method according to this embodiment is no longer hindered by the manner in which the macro base station and the micro base station are interconnected, and can be applied to a wider application range, which takes full advantage of the coordinated transmission technology.

In an optional implementation of this embodiment, before the communicating, by a UE, with a macro base station in a subframe in a first subframe set and communicating, by the UE, with a micro base station in a subframe in a second subframe set, the method includes: receiving, by the UE, a configuration of the first subframe set and/or a configuration of the second subframe set sent by the macro base station or the micro base station, so as to determine the first subframe set and the second subframe set.

The UE may determine, according to the configuration of the first subframe set, which subframe belong to the first subframe set, and meanwhile, determine which subframe belong to the second subframe set. Alternatively, the UE may determine, according to the configuration of the second subframe set, which subframe belong to the second subframe set, and meanwhile, determine which subframe belong to the first subframe set. Alternatively, the UE may determine, according to the configuration of the first subframe set, which subframe belong to the first subframe set; and determine, according to the configuration of the second subframe set, which subframe belong to the second subframe set.

Whether the foregoing configuration of the first subframe set and/or configuration of the second subframe set are/is sent by the macro base station or by the micro base station to the UE depends on where a signaling radio bearer (SRB) of the UE is connected to. If the SRB of the UE is connected to the macro base station, the foregoing configuration of the first subframe set and/or configuration of the second subframe set are generated and configured for the UE by the macro base station. If the SRB of the UE is connected to the micro base station, the foregoing configuration of the first subframe set and/or configuration of the second subframe set are generated and configured for the UE by the micro base station.

In an optional implementation of this embodiment, before the communicating, by a UE, with a macro base station in a subframe in a first subframe set, the method includes: determining, by the UE, a downlink subframe in the first subframe set, where the downlink subframe in the first subframe set meet that, if a downlink subframe n belongs to the first subframe set, a downlink subframe (n+8) also belongs to the first subframe set.

Based on the foregoing, an optional manner of determining, by the UE, a downlink subframe in the first subframe set is: determining, by the UE, the downlink subframe in the first subframe set according to formula (1).

$$[(10 \cdot n_f \lfloor n_s/2 \rfloor) \bmod 8] \in \Delta_{BSC} \qquad (1)$$

where $n_f$ is a subframe number, $n_s$ is a slot number, and $\Delta_{BSC}$ is a subframe offset set which is configured at a high layer at a network side. $\Delta_{BSC}$ may include one or multiple subframe offset values, for example, a value of $\Delta_{BSC}$ may be $\{0\}$, $\{1\}$, or $\{0,1\}$. Optionally, $\Delta_{BSC}$ may be the configuration of the first subframe set in the foregoing implementation. A subframe that meets the foregoing formula (1) is a downlink subframe in the first subframe set. It can be seen that two neighboring downlink subframes, obtained by the UE through calculation by using formula (1), in the first subframe set are spaced apart by 8 subframes.

For example, when the value of $\Delta_{BSC}$ may be $\{0\}$, downlink subframes, determined by the UE, in the first subframe set are shown as shaded boxes in a downlink frame (represented by DL in FIG. 1A) in FIG. 1A, where a number in a shaded box represents a subframe number.

Figure 1B:
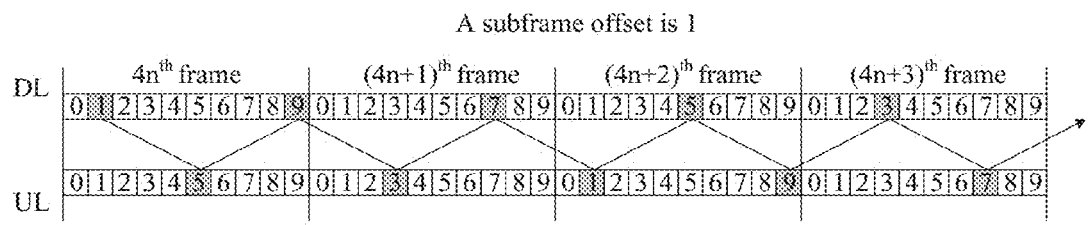

For example, when the value of $\Delta_{BSC}$ may be $\{1\}$, downlink subframes, determined by the UE, in the first subframe set are shown as shaded boxes in a downlink frame (represented by DL in FIG. 1B) in FIG. 1B, where a number in a shaded box represents a subframe number.

With reference to FIG. 1A and FIG. 1B, it can be known that when the value of $\Delta_{BSC}$ is $\{0\}$, the first downlink subframe in the first subframe set starts from subframe #0 in a start downlink frame, no offset occurs, and subsequent downlink subframes are spaced apart by 8 subframes; and when the value of $\Delta_{BSC}$ is $\{1\}$, the first downlink subframe in the first subframe set starts from subframe 1 in the start downlink frame, an offset occurs, and subsequent downlink subframes are spaced apart by 8 subframes.

This implementation offers advantages in terms of flexibility and ease of implementation. In addition, the network side only needs to configure a subframe offset set for the UE, and does not need to configure each downlink subframe in the first subframe set one by one for the UE, which simplifies configuration and reduces a configuration workload on the network side.

In addition to the foregoing implementation, a downlink subframe in the first subframe set may also be directly configured for the UE by the network side; and the UE determines, according to configuration of the network side, the downlink subframe in the first subframe set, where neighboring downlink subframes in the downlink subframes configured by the network side are spaced apart by 8 subframes.

In an optional implementation of this embodiment, the first subframe set of this embodiment further includes an uplink subframe; and then before the communicating, by a UE, with a macro base station in a subframe in a first subframe set, the method further includes: determining, by the UE, the uplink subframe in the first subframe set, where the uplink subframe in the first subframe set meet that, if a downlink subframe n belongs to the first subframe set, an uplink subframe (n+4) belongs to the first subframe set.

After the UE determines the downlink subframe in the first subframe set according to formula (1), the UE may directly determine subframe numbers of the uplink subframe in the first subframe set by adding 4 to subframe numbers of the determined downlink subframe in the first subframe set.

For example, as shown in FIG. 1A, when the value of $\Delta_{BSC}$ is {0}, shaded boxes in an uplink frame (represented by UL in FIG. 1A) are the uplink subframes in the first subframe set, where a number in a shaded box represents a subframe number. As shown in FIG. 1B, when the value of $\Delta_{BSC}$ is {1}, shaded boxes in an uplink frame (represented by UL in FIG. 1B) are the uplink subframes in the first subframe set, where a number in a shaded box represents a subframe number.

Optionally, in addition to the foregoing manners of determining the uplink subframe in the first subframe set, the UE may also determine the uplink subframe in the first subframe set according to formula (1). To meet the foregoing condition that when downlink subframe n belongs to the first subframe set, uplink subframe (n+4) belongs to first subframe set, a value of $\Delta_{BSC}$ in formula (1) used when determining the downlink subframe in the first subframe set is different than when determining the uplink subframe in the first subframe set, and the values meet a specific condition. That is, if the value of $\Delta_{BSC}$ is {a} when the UE determines, according to formula (1), the downlink subframe in the first subframe set, the value of $\Delta_{BSC}$ is {a+4} when the UE determines, according to formula (1), the uplink subframe in the first subframe set. Preferably, a value range of a is 0 to 9.

Optionally, the uplink subframe in the first subframe set may also be directly configured for the UE by the network side; and the UE determines, according to configuration of the network side, the uplink subframe in the first subframe set, where neighboring uplink subframes in the uplink subframes configured by the network side are spaced apart by 8 subframes.

It is noted herein that, because the uplink subframe and the downlink subframe in the first subframe set have a specific relationship, the UE may also first determine the uplink subframe in the first subframe set, and then determine, in accordance with the relationship, subframe number of the downlink subframe according to subframe number of the determined uplink subframe. For example, the UE may determine the uplink subframe in the first subframe set according to formula (1), and then determine, in accordance with the relationship, subframe number of the downlink subframe and according to subframe number of the determined uplink subframe. Alternatively, the network side may also configure only the uplink subframe in the first subframe set for the UE, and the UE first determines the uplink subframe in the first subframe set according to the configuration of the network side, and then determines, in accordance with the relationship, subframe number of the downlink subframe according to subframe number of the determined uplink subframe, which is favorable for reducing a configuration workload on the network side.

In an optional implementation of this embodiment, before the communicating, by the UE, with a micro base station in a subframe in a second subframe set, the method includes: determining, by the UE, a downlink subframe in the second subframe set, where the downlink subframe in the second subframe set meet that, if a downlink subframe m belongs to the second subframe set, a downlink subframe (m+8) also belongs to the second subframe set.

In an optional implementation of this embodiment, the second subframe set further includes an uplink subframe; and then before the communicating, by the UE, with a micro base station in a subframe in a second subframe set, the method further includes: determining, by the UE, the uplink subframe in the second subframe set, where the uplink subframe in the second subframe set meet that, if a downlink subframe m belongs to the second subframe set, an uplink subframe (m+4) also belongs to the second subframe set.

A manner of determining, by the UE, a downlink subframe and an uplink subframe in the second subframe set is the same as the manner of determining, by the UE, the downlink subframe and the uplink subframe in the first subframe set, and details are not described herein again.

In an optional implementation of this embodiment, the communicating, by a UE, with a macro base station in a subframe in a first subframe set includes:

communicating, by the UE, in the downlink with the macro base station in the subframe in the first subframe set. Specifically, the UE communicates in the downlink with the macro base station in a downlink subframe in the first subframe set.

In addition, the UE may also communicate in the uplink with the macro base station in the subframe in the first subframe set. Specifically, the UE communicates in the uplink with the macro base station in an uplink subframe in the first subframe set.

In an optional implementation of this embodiment, the communicating, by a UE, with a micro base station in a subframe in a second subframe set includes:

communicating, by the UE, in the downlink with the micro base station in the subframe in the second subframe set. Specifically, the UE communicates in the downlink with the micro base station in the downlink subframe in the second subframe set.

In addition, the UE may further communicate in the uplink with the micro base station in the subframe in the second subframe set. Specifically, the UE communicates in the uplink with the UE in the uplink subframe in the second subframe set.

This embodiment of the present invention provides an implementation in which the UE exchanges different signals or channels with the macro base station and the micro base station in the subframe in the first subframe set and the second subframe set, respectively.

Communicating, by the UE, in the downlink with the macro base station in a downlink subframe in the first subframe set includes any one of the following operations or a combination thereof:

receiving, by the UE in the downlink subframe in the first subframe set, a cell-specific reference signal (CRS) and a channel demodulated based on the CRS that are sent by the macro base station, where the channel demodulated based on the CRS includes but is not limited to: a PDCCH, a PBCH, a physical control format indicator channel (PCFICH), a physical hybrid automatic repeat request (HARQ) indicator channel (PHICH), and a PDSCH; for example, the macro base station delivers control signaling to the UE through the PDCCH while the micro base station delivers control signaling to the UE through an evolved physical downlink control channel (ePDCCH);

receiving, by the UE in the downlink subframe in the first subframe set, a primary synchronization signal (PSS) sent by the macro base station;

receiving, by the UE in the downlink subframe in the first subframe set, a secondary synchronization signal (SSS) sent by the macro base station; and receiving, by the UE in the downlink subframe in the first subframe set, an ePDCCH that is demodulated based on a demodulation reference signal (DMRS) and sent by the macro base station.

Accordingly, communicating, by the UE, in the downlink with the micro base station in downlink subframe in the second subframe set includes any one of the following operations or a combination thereof:

receiving, by the UE in the downlink subframe in the second subframe set, a channel state information reference signal (CSI-RS) sent by the micro base station, where optionally, if a channel demodulated based on the CSI-RS appears, the channel demodulated based on the CSI-RS may also be sent to the UE by the micro base station in the downlink subframe in the second subframe set; and receiving, by the UE in the downlink subframe in the second subframe set, a DMRS and a channel demodulated based on the DMRS that are sent by the micro base station, where the channel demodulated based on the DMRS includes but is not limited to: an ePDCCH and a PDSCH.

It should be noted herein that, if the macro base station needs to send control signaling to the UE, the macro base station uses a PDCCH scrambled by the CRS; and if the micro base station needs to send control signaling to the UE, the micro base station uses an ePDCCH scrambled by the DMRS. Because transmission between the macro base station and the UE occur in different subframes than transmission between the micro base station and the UE, another optional implementation is that the macro base station and the micro base station separately send an ePDCCH scrambled by the DMRS to the UE in different subframes.

The foregoing sending different signals and channels to the UE by the macro base station and the micro base station is merely one implementation in which the macro base station and the micro base station coordinate to communicate with the UE, and the present invention is not limited thereto. For example, he macro base station sends a PSS and an SSS to the UE, and the micro base station may also send a PSS and an SSS to the UE.

Preferably, for purposes of backward compatibility, in one downlink subframe, the UE receives a downlink grant and a PDSCH from either the macro base station or the micro base station.

The UE may separately monitor UE-specific search space in a PDCCH and an ePDCCH to find downlink control information (DCI) specific to the UE.

Generally, both user data and control signaling of the UE is carried by a radio bearer (RB). In this embodiment, as different transmit sources, the macro base station and the micro base station cannot share a context of the UE in real time. Therefore, in order to ensure normal transmission of uplink and downlink data, uplink and downlink data on a same RB of the UE should be transmitted between the UE and a same transmit source (either the macro base station or the micro base station). In downlink communication, the macro base station or the micro base station may control, by means of traffic distribution, downlink data on a same RB of the UE to transmit to only one transmit source (either the macro base station or the micro base station). However, in uplink communication, no base station (no matter whether it is the macro base station or the micro base station) in the prior art can directly control which site uplink data in an RB of the UE will be transmitted to. What is needed is a solution allowing uplink data on a same RB of the UE to be transmitted between the UE and a same transmit source. To address this problem, this embodiment of the present invention provides a solution, which specifically is:

before communicating, by the UE, in the uplink with the macro base station in an uplink subframe in the first subframe set, receiving a first association relationship sent by the macro base station or the micro base station, where the first association relationship includes an identifier of a logical channel associated with the first subframe set, and there is a one-to-one correspondence between the logical channel and an RB. Based on this, the communicating, by the UE, in the uplink with the macro base station in the uplink subframe in the first subframe set specifically is: sending, by the UE in the uplink subframe in the first subframe set according to the first association relationship, data on the RB corresponding to the logical channel identifier in the first association relationship to the macro base station. Because the UE communicates with only the macro base station in the uplink subframe in the first subframe set, by binding data on a same RB with the first subframe set, it can be ensured that data on the RB is transmitted only between the UE and the macro base station.

Whether the foregoing first association relationship received by the UE is from the macro base station or the micro base station specifically depends on where an SRB of the UE is connected to. If the SRB of the UE is connected to the macro base station, the foregoing first association relationship is generated and configured for the UE by the macro base station. If the SRB of the UE is connected to the micro base station, the foregoing first association relationship is generated and configured for the UE by the micro base station.

Correspondingly, before the communicating, by the UE, in the uplink with the micro base station in an uplink subframe in the second subframe set, the method includes: receiving a second association relationship sent by the macro base station or the micro base station, where the second association relationship includes an identifier of a logical channel associated with the second subframe set. Based on this, the communicating, by the UE, in the uplink with the macro base station in uplink subframe in the second subframe set specifically is: sending, by the UE in the uplink subframe in the second subframe set according to the second association relationship, data on an RB corresponding to the identifier of the logical channel in the second association relationship to the micro base station. Because the UE communicates with only the micro base station in the uplink subframe in the second subframe set, by binding data on a same RB with the second subframe set, it can be ensured that data on the RB is transmitted only between the UE and the micro base station.

Whether the foregoing second association relationship received by the UE is from the macro base station or the micro base station specifically depends on where an SRB of the UE is connected to. If the SRB of the UE is connected to the macro base station, the foregoing second association relationship is generated and configured for the UE by the macro base station. If the SRB of the UE is connected to the micro base station, the foregoing second association relationship is generated and configured for the UE by the micro base station.

Figure 2:
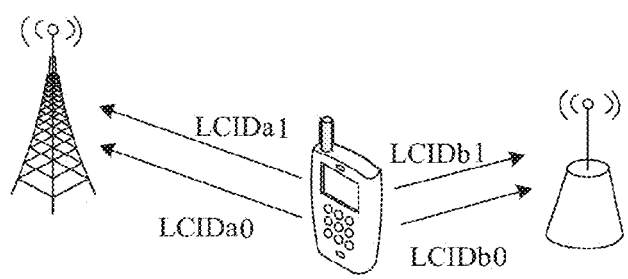
FIG. 2 is a schematic diagram of transmitting different RB data on a UE between the UE and different base stations (a macro base station and a micro base station) according to an embodiment of the present invention.

It should be noted herein that, which RB or RBs of the UE has its or their data bound with the first subframe set and which RB or RBs has its or their data bound with the second subframe set are not limited in this embodiment of the present invention, and may be specifically determined according to an actual application requirement. As shown in FIG. 2, data carried by logical channels whose logical channel identifiers are {LCIDa0, . . . , LCIDai} is transmitted in the subframe in the first subframe set, that is, transmission is performed between the UE and the macro base station; and data carried by logical channels whose logical channel identifiers are {LCIDb0, . . . , LCIDbj} is transmitted in the subframe in the second subframe set, that is, transmission is performed between the UE and the micro base station.

In this embodiment of the present invention, because communication between the UE and the macro base station and communication between the UE and the micro base station occur in two different subframe sets, and because a channel condition between the UE and the macro base station and a channel condition between the UE and the micro base station are different, their respective related physical layer parameter configurations may be the same, and may also be different.

Based on the foregoing, in an optional implementation of this embodiment, before the communicating, by a UE, with a macro base station in a subframe in a first subframe set, the method may include: receiving, by the UE, a first physical layer parameter configuration sent by the macro base station or the micro base station, where the first physical layer parameter configuration is configured by a network side for a channel between the UE and the macro base station. Then the communicating, by a UE, with a macro base station in a subframe in a first subframe set specifically is: communicating, by the UE, with the macro base station in the subframe in the first subframe set according to the first physical layer parameter configuration, that is, the UE uses the first physical layer parameter configuration to communicate with the macro base station.

In another optional implementation of this embodiment, before the communicating, by the UE, with a micro base station in a subframe in a second subframe set, the method may include: receiving, by the UE, a second physical layer parameter configuration sent by the macro base station or the micro base station, where the second physical layer parameter configuration is configured by a network side for a channel between the UE and a micro base station, and the second physical layer parameter configuration is different from the first physical layer parameter configuration. When it is mentioned that the second physical layer parameter configuration is different from the first physical layer parameter configuration, it mainly means that values of physical layer parameters are different, while configured physical layer parameters may be the same and may also be different.

In both the first physical layer parameter configuration and the second physical layer parameter configuration, physical layer parameters that need to be configured include but are not limited to: a dedicated PDSCH configuration (PDSCH-ConfigDedicated), a dedicated physical uplink control channel (PUCCH) configuration (PUCCH-ConfigDedicated), a dedicated uplink power control configuration (UplinkPowerControlDedicated), a scheduling request configuration (schedulingRequestConfig), and a channel quality report configuration (cqi-ReportConfig).

Whether the foregoing first physical layer parameter configuration and second physical layer parameter configuration received by the UE are sent by the macro base station or the micro base station depends on where an SRB of the UE is connected to. If the SRB of the UE is connected to the macro base station, the foregoing first physical layer parameter configuration and second physical layer parameter configuration are generated and configured for the UE by the macro base station. If the SRB of the UE is connected to the micro base station, the foregoing first physical layer parameter configuration and second physical layer parameter configuration are generated and configured for the UE by the micro base station.

That is, the network side may provide different physical layer parameter configurations for different subframe sets of the UE. In this way, the UE may use corresponding physical layer parameter configurations to perform air interface transmission in subframes in different subframe subsets, which is favorable for adapting to different channel conditions and improving transmission quality.

It should be noted herein that the network side may also not provide different physical layer parameter configurations for different subframe sets of the UE; and then the UE may use a same physical layer parameter configuration to perform air interface transmission in subframes in different subframe subsets, which is favorable to saving configuration signaling of the network side.

It should be noted herein that, this embodiment of the present invention is described from the perspective of the UE; however, in order to ensure that there is no conflict between the first subframe set and the second subframe set, which are used by the UE to transmit with the macro base station and the micro base station respectively, the macro base station and the micro base station may interact with each other, to negotiate and determine the first subframe set and the second subframe set. In addition, in order to support HARQ, all HARQ processes also need to be bound with different subframe sets, that is, separate HARQ processes need to be determined for the macro base station and for the micro base station, so as to avoid occurrence of a conflict. A HARQ process identifier is a UE-level concept, but not a site-level concept, that is, the macro base station and the micro base station cannot use a same HARQ process identifier when communicating with a same UE. For a frequency division duplexing (FDD) system, one UE can have only a maximum of 8 HARQ processes. Assume that there are two UEs, a first UE and a second UE. The macro base station may use a HARQ process identifier set $\{0, 1, 2, 3\}$ to communicate with the first UE, and the micro base station may use a HARQ process identifier set $\{4, 5, 6, 7\}$ to communicate with the first UE; the macro base station may use a HARQ process identifier set $\{0,1\}$ to communicate with the second UE, and the micro base station may use a HARQ process identifier set $\{2, 3, 4, 5, 6, 7\}$ to communicate with the second UE, where grouping of a subframe set and grouping of a process identifier set should match. For an FDD system, 40 consecutive subframes are grouped into 8 subframe subsets (each subset includes 5 subframes); and the number of subframe subsets, which are included in a first subframe set or a second subframe set that is used by the macro base station or the micro base station respectively to communicate with a UE, should be equal to the number of HARQ process identifiers allocated to the macro base station or the micro base station, where the macro base station or the micro base station may determine their respective used HARQ processes by means of interaction and negotiation.

Optionally, the macro base station and the micro base station may determine their respective subframe sets and HARQ process identifier sets by means of different interaction processes, and may also determine their respective subframe sets and HARQ process identifier sets at the same time in a same interaction process. Preferably, negotiation over the subframe sets and the HARQ process identifier sets is completed at the same time in a same interaction process.

In the foregoing preferable implementation, a specific implementation is that: The macro base station determines the first subframe set, the second subframe set, and separate HARQ process identifier sets that are used by the macro base station and the micro base station and correspond to the UE; and sends to the micro base station the first subframe set, the second subframe set, and the separate HARQ process identifier sets that are used by the macro base station and the micro base station and correspond to the UE, so that the micro base station determines the second subframe set and the HARQ process identifier set that are used by the micro base station and correspond to the UE. Another specific implementation is that: The macro base station determines the first subframe set and a HARQ process identifier set that is used by the macro base station and corresponds to the UE; and sends to the micro base station the first subframe set and the HARQ process identifier set that is used by the macro base station and corresponds to the UE, so that the micro base station uses all or some of other subframes than subframes in the first subframe set, as the second subframe set, uses all or some of other HARQ processes than HARQ processes used by the macro base station, as HARQ processes to be used by the micro base station, and returns a selection result to the macro base station. Still another implementation is: The macro base station determines the first subframe set, the second subframe set, and separate HARQ process identifier sets that are used by the macro base station and the micro base station and correspond to the UE; and then sends the micro base station the second subframe set, and the HARQ process identifier set that is used by the micro base station and correspond to the UE.

In the foregoing implementations, the macro base station may notify the micro base station of a HARQ process identifier set by using an explicit-definition manner. For example, a bitmap is used to indicate the first subframe set and/or the second subframe set, and an 8-bit bitmap may also be used to indicate which HARQ processes are used by the micro base station and correspond to the UE and/or which HARQ processes are used by the macro base station and correspond to the UE. For example, a corresponding bit 1 indicates that the HARQ process is used by the macro base station, and a corresponding bit 0 indicates that the HARQ process is used by the micro base station.

In the foregoing implementations, the macro base station may further notify the micro base station of a HARQ process identifier set by using an implicit-definition manner. For example, a one-to-one mapping relationship between a HARQ process identifier set and a subframe set may be predefined. For example, a bitmap indicating subframes that can be used by the micro base station is configured. If the k$^{th}$ (0=<k<=7) bit of the bitmap is 1, the micro base station uses a HARQ process whose process identifier is k. In this way, the volume of data sent by the macro base station to the micro base station is reduced, which is favorable for improving transmission efficiency. It should be noted herein that the foregoing interaction and negotiation procedure between the macro base station and the micro base station may be an initial context request/response (INITIAL CONTEXT REQUEST/RESPONSE) procedure, or may be a UE context modification request/response (UE CONTEXT MODIFICATION REQUEST/RESPONSE) procedure, but is not limited thereto. That is, the first subframe set and/or the second subframe set sent to the micro base station by the macro base station, and a HARQ process identifier that is used by the macro base station and correspond to the UE and/or a HARQ process identifier that is used by the micro base station and correspond to the UE may be carried in an INITIAL CONTEXT REQUEST or a UE CONTEXT MODIFICATION REQUEST that is sent to the micro base station and sent to the micro base station.

It can be seen from the above that the coordinated transmission method according to this embodiment of the present invention uses a time division multiplexing manner in which a UE separately communicates with a macro base station and a micro base station, so that the macro base station and the micro base station do not need to share a context of the UE in real time, which lowers a requirement on a communication delay on an air interface side. In this way, there is no longer a limitation imposed on an interconnection manner between the macro base station and the micro base station, thereby extending application scenarios and scopes of the coordinated transmission technology. In addition, the method of this embodiment further provides various implementations, to solve a plurality of problems that may be confronted during a coordinated transmission procedure. For example, data on a same RB of the UE is transmitted only between the UE and one transmit source, which ensures data transmission accuracy. For another example, different physical layer parameter configurations are provided for different subframe sets, which improves communication quality. For still another example, the macro base station and the micro base station exchange different signals or channels with the UE, which not only implements coordinated transmission but also improves communication efficiency.

Another embodiment of the present invention provides a coordinated transmission method, and this embodiment is described from the perspective of a macro base station. The method specifically includes: communicating, by the macro base station, with a UE in a subframe in a first subframe set, where the UE further communicates with a micro base station in a subframe in a second subframe set, where the subframe in the first subframe set and the subframe in the second subframe set do not overlap.

The UE in this embodiment is located in coverage of both the macro base station and the micro base station, and communicates with the macro base station and the micro base station separately in a time division multiplexing manner.

In an optional implementation of this embodiment, in order to ensure that there is no conflict between the first subframe set and the second subframe set, which are used by the UE to transmit with the macro base station and the micro base station respectively, before the communicating, by the macro base station, with a UE in a subframe in a first subframe set, the method includes: sending, by the macro base station, the first subframe set and/or the second subframe set to the micro base station, so that the micro base station acquires the second subframe set.

In addition, in order to support HARQ, it is further required to determine separate HARQ processes that are used by the macro base station and the micro base station and correspond to the UE. That is, the macro base station further needs to send a HARQ process identifier set that is used by the macro base station and corresponds to the UE and/or a HARQ process identifier set that is used by the micro base station and corresponds to the UE to the micro base station, so that the micro base station acquires the HARQ process identifier set that is used by the micro base station and corresponds to the UE.

For other implementations of sending, by the macro base station, a used subframe set and a HARQ process identifier set to the micro base station, and detailed description of each other implementation, refer to corresponding description in the foregoing embodiments, which are not described herein again.

In an optional implementation of this embodiment, the UE communicates with the macro base station and the micro base station separately in subframes in different subframe sets whose channel conditions are different. In order to adapt to different channel conditions and improve communication quality, before the communicating, by the macro base station, with a UE in a subframe in a first subframe set, the method further includes: sending, by the macro base station to the UE, a first physical layer parameter configuration and a second physical layer parameter configuration respectively corresponding to the first subframe set and the second subframe set. In this way, the UE can use a physical layer parameter configuration corresponding to each channel condition to transmit signal, which is favorable for improving transmission quality.

In the foregoing implementation, before sending the first physical layer parameter configuration and the second physical layer parameter configuration to the UE, the macro base station needs to acquire the first physical layer parameter configuration and the second physical layer parameter configuration.

Optionally, the first physical layer parameter configuration is determined by the macro base station and the second physical layer parameter configuration is determined by the micro base station, and then a manner of acquiring, by the macro base station, the first physical layer parameter configuration and the second physical layer parameter configuration is: determining, by the macro base station, the first physical layer parameter configuration and receiving the second physical layer parameter configuration sent by the micro base station.

Optionally, both the first physical layer parameter configuration and the second physical layer parameter configuration may be determined by the macro base station, and a manner of acquiring, by the macro base station, the first physical layer parameter configuration and the second physical layer parameter configuration is: separately determining, by the macro base station, the first physical layer parameter configuration and the second physical layer parameter configuration. Based on this, the method of this embodiment further includes: sending, by the macro base station, the second physical layer parameter configuration to the micro base station, so that the micro base station learns about the second physical layer parameter configuration.

In an optional implementation of this embodiment, the macro base station communicates in the downlink with the UE in the subframe in the first subframe set. Specifically, the macro base station communicates in the downlink with the UE in a downlink subframe in the first subframe set. The communicating, by the macro base station, in the downlink with the UE in a downlink subframe in the first subframe set includes any one of the following operations or a combination thereof:

sending, by the macro base station in the downlink subframe in the first subframe set, a CRS and a channel demodulated based on the CRS to the UE;

sending, by the macro base station in the downlink subframe in the first subframe set, a PSS to the UE;

sending, by the macro base station in the downlink subframe in the first subframe set, an SSS to the UE; and sending, by the macro base station in the downlink subframe in the first subframe set, an ePDCCH demodulated based on a DMRS to the UE.

In an optional implementation of this embodiment, the macro base station communicates in the uplink with the UE in the subframe in the first subframe set. Specifically, the macro base station communicates in the uplink with the UE in an uplink subframe in the first subframe set.

In order to ensure that data on a same RB of the UE can be transmitted only between the UE and the macro base station, before the macro base station communicates in the uplink with the UE in the uplink subframe in the first subframe set, the method includes: sending, by the macro base station, a first association relationship to the UE, where the first association relationship includes an identifier of a logical channel associated with the first subframe set. Based on this, the communicating, by the macro base station, in the uplink with the UE in the uplink subframe in the first subframe set includes: receiving, by the macro base station in the uplink subframe in the first subframe set, data, sent by the UE, on an RB corresponding to the identifier of the logical channel in the first association relationship.

In addition, in order to ensure that data on another RB on the UE is transmitted only between the UE and the micro base station, the macro base station may further send a second association relationship to the UE, where the second association relationship includes an identifier of a logical channel associated with the second subframe set, so that the UE sends, in the uplink subframe in the second subframe set, data on an RB corresponding to the identifier of the logical channel in the second association relationship to the micro base station.

In an optional implementation of this embodiment, to enable the UE to distinguish between the first subframe set and the second subframe set, before the communicating with a UE in a subframe in a first subframe set, the macro base station sends a configuration of the first subframe set and/or a configuration of the second subframe set to the UE, so that the UE distinguishes between the first subframe set and the second subframe set.

It should be noted herein that, when an SRB of the UE is connected to the macro base station, the macro base station sends the UE the first physical layer parameter configuration, the second physical layer parameter configuration, the first association relationship, the second association relationship, and the configuration of the first subframe set and/or the configuration of the second subframe set.

For detailed description of the coordinated transmission method according to this embodiment, refer to description of a corresponding procedure in the foregoing embodiment, which is not described herein again.

It can be seen from the above that, in the coordinated transmission method according to this embodiment of the present invention, a macro base station supports a UE to separately communicate with the macro base station and a micro base station in a time division multiplexing manner, and the macro base station communicates with the UE in a subframe in a first subframe set, so that the macro base station and the micro base station do not need to share a context of the UE in real time, which lowers a requirement on a communication delay on an air interface side. In this way, there is no longer a limitation imposed on an interconnection manner between the macro base station and the micro base station, thereby extending application scenarios and scopes of the coordinated transmission technology. In addition, the method of this embodiment further provides various implementations, to solve a plurality of problems that may be confronted during a coordinated transmission procedure. For example, data on a same RB of the UE is transmitted only between the UE and one transmit source, which ensures data transmission accuracy. For another example, different physical layer parameter configurations are provided for different subframe sets, which improves communication quality. For still another example, the macro base station and the micro base station exchange different signals or channels with the UE, which not only implements coordinated transmission but also improves communication efficiency.

Still another embodiment of the present invention provides a coordinated transmission method, and this embodiment is described from the perspective of a micro base station. The method of this embodiment includes: communicating, by the micro base station, with a UE in a subframe in a second subframe set, where the UE further communicates with a macro base station in a subframe in a first subframe set, where the subframe in the first subframe set and the subframe in the second subframe set do not overlap.

The UE in this embodiment is located in coverage of both the macro base station and the micro base station, and communicates with the macro base station and the micro base station separately in a time division multiplexing manner.

In an optional implementation of this embodiment, in order to ensure that there is no conflict between the first subframe set and the second subframe set, which are used by the UE to transmit with the macro base station and the micro base station respectively, before the communicating, by the macro base station, with a UE in a subframe in a first subframe set, the method includes: sending, by the macro base station, the first subframe set and/or the second subframe set to the micro base station, so that the micro base station acquires the second subframe set. Accordingly, the micro base station receives the first subframe set and/or the second subframe set sent by the macro base station, so as to acquire the second subframe set.

In addition, in order to support HARQ, it is further required to determine separate HARQ processes used by the macro base station and the micro base station. That is, the macro base station further needs to send to the micro base station a HARQ process identifier set that is used by the macro base station and corresponds to the UE and/or a HARQ process identifier set that is used by the micro base station and corresponds to the UE, so that the micro base station acquires the HARQ process identifier set that is used by the micro base station and corresponds to the UE. Accordingly, the micro base station receives, from the macro base station, the HARQ process identifier set that is used by the macro base station and corresponds to the UE and/or the HARQ process identifier set that is used by the micro base station and corresponds to the UE, so as to acquire the HARQ process identifier set that is used by the micro base station.

For other implementations of sending, by the macro base station, a used subframe set and a HARQ process identifier set to the micro base station, and detailed description of each other implementation, refer to corresponding description in the foregoing embodiments, which are not described herein again.

In an optional implementation of this embodiment, the UE communicates with the macro base station and the micro base station separately in subframes in different subframe sets whose channel conditions are different. In order to adapt to different channel conditions and improve communication quality, before the communicating, by the micro base station, with a UE in a subframe in a second subframe set, the method further includes: sending, by the micro base station to the UE, a first physical layer parameter configuration and a second physical layer parameter configuration respectively corresponding to the first subframe set and the second subframe set. In this way, the UE can use a physical layer parameter configuration corresponding to each channel condition to transmit signal, which is favorable for improving transmission quality.

In the foregoing implementation, before sending the first physical layer parameter configuration and the second physical layer parameter configuration respectively corresponding to the first subframe set and the second subframe set to the UE, the micro base station needs to acquire the first physical layer parameter configuration and the second physical layer parameter configuration.

Optionally, the first physical layer parameter configuration is determined by the macro base station, and the second physical layer parameter configuration is determined by the micro base station. Then a manner of acquiring, by the micro base station, the first physical layer parameter configuration and the second physical layer parameter configuration includes: determining, by the micro base station, the second physical layer parameter configuration and receiving the first physical layer parameter configuration sent by the macro base station.

Optionally, both the first physical layer parameter configuration and the second physical layer parameter configuration may be determined by the micro base station. Then a manner of acquiring, by the micro base station, the first physical layer parameter configuration and the second physical layer parameter configuration includes: separately determining, by the micro base station, the first physical layer parameter configuration and the second physical layer parameter configuration. Based on this, the method of this embodiment further includes: sending, by the micro base station, the first physical layer parameter configuration to the macro base station, so that the macro base station learns about the first physical layer parameter configuration.

In an optional implementation of this embodiment, the micro base station communicates in the downlink with the UE in the subframe in the second subframe set. Specifically, the micro base station communicates in the downlink with the UE in a downlink subframe in the second subframe set. The communicating, by the micro base station, in the downlink with the UE in the downlink subframe in the second subframe set includes any one of the following operations or a combination thereof:

sending, by the micro base station in the downlink subframe in the second subframe set, a CSI-RS to the UE; and sending, by the micro base station in the downlink subframe in the second subframe set, a DMRS and a channel demodulated based on the DMRS to the UE.

In an optional implementation of this embodiment, the micro base station communicates in the uplink with the UE in the subframe in the second subframe set. Specifically, the UE communicates in the uplink with the micro base station in an uplink subframe in the second subframe set.

In order to ensure that data on a same RB of the UE can be transmitted only between the UE and the micro base station, before the micro base station communicates in the uplink with the UE in the uplink subframe in the second subframe set, the method includes: sending, by the micro base station, a second association relationship to the UE, where the second association relationship includes an identifier of a logic channel associated with the second subframe set. Based on this, the communicating, by the micro base station, in the uplink with the UE in uplink subframe in the second subframe set includes: receiving, by the micro base station in the uplink subframe in the second subframe set, data, sent by the UE, on an RB corresponding to the identifier of the logical channel in the second association relationship.

In addition, in order to ensure that data on another RB on the UE is transmitted only between the UE and the macro base station, the micro base station may further send a first association relationship to the UE, where the first association relationship includes an identifier of a logical channel associated with the first subframe set, so that the UE sends, in the uplink subframe in the first subframe set, data on an RB corresponding to the identifier of the logical channel in the first association relationship to the micro base station.

In an optional implementation of this embodiment, to enable the UE to distinguish between the first subframe set and the second subframe set, before the communicating with a user equipment UE in a subframe in a second subframe set, the micro base station sends a configuration of the first subframe set and/or a configuration of the second subframe set to the UE, so that the UE distinguishes between the first subframe set and the second subframe set.

It should be noted herein that, when an SRB of the UE is connected to the micro base station, the micro base station sends the UE the first physical layer parameter configuration, the second physical layer parameter configuration, the first association relationship, the second association relationship, and the configuration of the first subframe set and/or the configuration of the second subframe set.

For detailed description of the coordinated transmission method according to this embodiment, refer to description of a corresponding procedure in the foregoing embodiments, which is not described herein again.

It can be seen from the above that, in the coordinated transmission method according to this embodiment of the present invention, a micro base station supports a UE to separately communicate with a macro base station and the micro base station in a time division multiplexing manner, and the micro base station communicates with the UE in a subframe in a second subframe set, so that the macro base station and the micro base station do not need to share a context of the UE in real time, which lowers a requirement on a communication delay on an air interface side. In this way, there is no longer a limitation imposed on an interconnection manner between the macro base station and the micro base station, thereby extending application scenarios and scopes of the coordinated transmission technology. In addition, the method of this embodiment further provides various implementations, to solve a plurality of problems that may be confronted during a coordinated transmission procedure. For example, data on a same RB of the UE is transmitted only between the UE and one transmit source, which ensures data transmission accuracy. For another example, different physical layer parameter configurations are provided for different subframe sets, which improves communication quality. For still another example, the macro base station and the micro base station exchange different signals or channels with the UE, which not only implements coordinated transmission but also improves communication efficiency.

Figure 3:
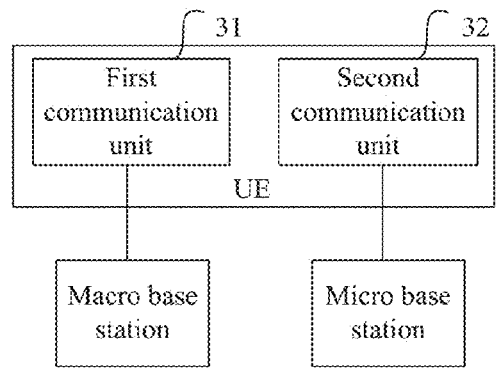
FIG. 3 is a schematic structural diagram of a UE according to an embodiment of the present invention.

FIG. 3 is a schematic structural diagram of a UE according to an embodiment of the present invention. As shown in FIG. 3, the UE of this embodiment includes: a first communication unit 31 and a second communication unit 33.

The first communication unit 31 is connected to a macro base station, and is configured to communicate with the macro base station in a subframe in a first subframe set; and the second communication unit 32 is connected to a micro base station, and is configured to communicate with the micro base station in a subframe in a second subframe set, where the subframe in the first subframe set and the subframe in the second subframe set do not overlap.

The function units of the UE according to this embodiment may be configured to execute a procedure of the foregoing method embodiment described from the perspective of the UE, and specific working principles of the function units are not described herein again.

The UE of this embodiment separately communicates with a macro base station and a micro base station in a time division multiplexing manner, and a context of the UE is separately created on the macro base station and the micro base station, so that the macro base station and the micro base station do not need to share a context of the UE in real time, which lowers a requirement on a communication delay of a backhaul link between the macro base station and the micro base station. In this way, the macro base station and the micro base station are not required to be interconnected by means of optical fibers or high-speed microwaves. The coordinated transmission method according to this embodiment is no longer hindered by the manner in which the macro base station and the micro base station are interconnected, and can be applied to a wider application range, which takes full advantage of the coordinated transmission technology.

Figure 4:
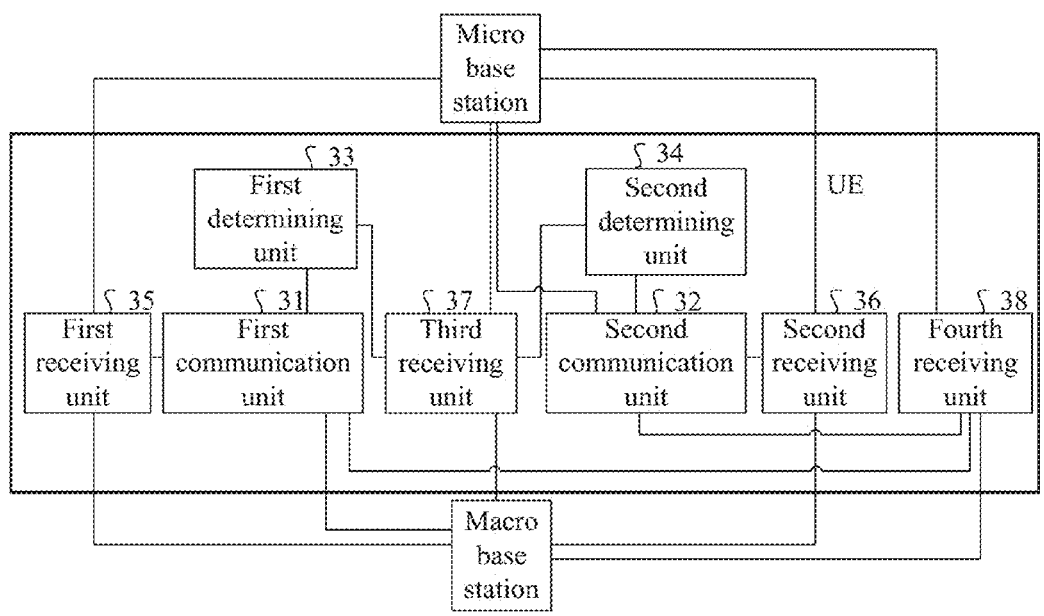
FIG. 4 is a schematic structural diagram of a UE according to another embodiment of the present invention.

FIG. 4 is a schematic structural diagram of a UE according to another embodiment of the present invention. This embodiment is implemented based on the embodiment shown in FIG. 3. As shown in FIG. 4, in addition to including the first communication unit 31 and the second communication unit 32, the UE of this embodiment further includes: a first determining unit 33.

The first determining unit 33 is configured to determine a downlink subframe in the first subframe set, where the downlink subframe in the first subframe set meet that, if a downlink subframe n belongs to the first subframe set, a downlink subframe (n+8) also belongs to the first subframe set.

Optionally, the first determining unit 33 is further configured to determine an uplink subframe in the first subframe set, where the uplink subframe in the first subframe set meet that, if downlink subframe n belongs to the first subframe set, uplink subframe (n+4) belongs to the first subframe set.

The first determining unit 33 is connected with the first communication unit 31, and is configured to provide the downlink subframe and/or uplink subframe in the first subframe set to the first communication unit 31.

Optionally, the UE of this embodiment may further include: a second determining unit 34, where the second determining unit 34 is configured to determine the downlink subframe in the second subframe set, where the downlink subframe in the second subframe set meet that, if downlink subframe m belongs to the second subframe set, downlink subframe (m+8) also belongs to the second subframe set.

Optionally, the second determining unit 34 is further configured to determine the uplink subframe in the second subframe set, where the uplink subframe in the second subframe set meet that, if downlink subframe m belongs to the second subframe set, uplink subframe (m+4) belongs to the second subframe set.

The second determining unit 34 is connected with the second communication unit 32, and is configured to provide the downlink subframe and/or uplink subframe in the second subframe set to the second communication unit 32.

In an optional implementation, the first communication unit 31 is specifically configured to communicate in the downlink with the macro base station in the downlink subframe in the first subframe set.

That the first communication unit 31 is specifically configured to communicate in the downlink with the macro base station in the downlink subframe in the first subframe set includes that: the first communication unit 31 is specifically configured to execute any one of the following operations or a combination thereof:

the first communication unit 31 is specifically configured to receive, in the downlink subframe in the first subframe set, a CRS and a channel demodulated based on the CRS that are sent by the macro base station;

the first communication unit 31 is specifically configured to receive, in the downlink subframe in the first subframe set, a PSS sent by the macro base station;

the first communication unit 31 is specifically configured to receive, in the downlink subframe in the first subframe set, an SSS sent by the macro base station; and the first communication unit 31 is specifically configured to receive, in the downlink subframe in the first subframe set, an ePDCCH that is demodulated based on a DMRS and sent by the macro base station.

In an optional implementation, the first communication unit 31 is specifically configured to communicate in the uplink with the macro base station in the uplink subframe in the first subframe set.

Optionally, the UE of this embodiment further includes: a first receiving unit 35, where the first receiving unit 35 is connected to the first communication unit 31, and is configured to receive, before the first communication unit 31 communicates in the downlink with the macro base station in the downlink subframe in the first subframe set, a first association relationship sent by the macro base station or the micro base station, where the first association relationship includes an identifier of a logical channel associated with the first subframe set. The first receiving unit 35 is further connected to the macro base station or the micro base station. Based on this, the first communication unit 31 is specifically configured to send, in the uplink subframe in the first subframe set according to the first association relationship received by first receiving unit 35, data on an RB corresponding to the logical channel in the first association relationship to the macro base station. Data in a same RB on the UE of this embodiment is transmitted only between the UE and one transmit source (that is, the macro base station).

In an optional implementation, the second communication unit 32 is specifically configured to communicate in the downlink with the micro base station in the subframe in the second subframe set.

That the second communication unit 32 is specifically configured to communicate in the downlink with the micro base station in the subframe in the second subframe set includes that: the second communication unit 32 is specifically configured to execute any one of the following operations or a combination thereof:

the second communication unit 32 is specifically configured to receive, in the downlink subframe in the second subframe set, a CSI-RS sent by the micro base station; and the second communication unit 32 is specifically configured to receive, in the downlink subframe in the second subframe set, a DMRS and a channel demodulated based on the DMRS that are sent by the micro base station.

In an optional implementation, the second communication unit 32 is specifically configured to communicate in the uplink with the micro base station in uplink subframe in the second subframe set.

Optionally, the UE of this embodiment further includes: a second receiving unit 36, where the second receiving unit 36 is connected to the second communication unit 32, and is configured to receive, before the second communication unit 32 communicates in the uplink with the micro base station in the uplink subframe in the second subframe set, a second association relationship sent by the macro base station or the micro base station, where the second association relationship includes an identifier of a logical channel associated with the second subframe set. The second receiving unit 36 is further connected to the macro base station or the micro base station. Based on this, the second communication unit 32 is specifically configured to send, in the uplink subframe in the second subframe set according to the second association relationship received by second receiving unit 36, data on an RB corresponding to the logical channel in the second association relationship to the micro base station. Data in a same RB on the UE of this embodiment is transmitted only between the UE and one transmit source (that is, the micro base station).

In an optional implementation, the UE of this embodiment further includes: a third receiving unit 37, where the third receiving unit 37 is connected to the macro base station or the micro base station, and is configured to receive a configuration of the first subframe set and/or a configuration of a second subframe set, so as to distinguish between the first subframe set and the second subframe set. Optionally, the third receiving unit 37 is connected to the first determining unit 33 and the second determining unit 34.

In an optional implementation, the UE of this embodiment further includes: a fourth receiving unit 38, where the fourth receiving unit 38 is configured to receive a first physical layer parameter configuration sent by the macro base station or the micro base station. Based on this, the first communication unit 31 is specifically configured to communicate with the macro base station in the subframe in the first subframe set according to the first physical layer parameter configuration. The fourth receiving unit 38 is connected to the first communication unit 31, and is configured to provide the first physical layer parameter configuration to the first communication unit 31.

In an optional implementation, the fourth receiving unit 38 is further configured to receive a second physical layer parameter configuration sent by the macro base station or the micro base station. Optionally, the second physical layer parameter configuration is different from the first physical layer parameter configuration. Based on this, the second communication unit 32 is specifically configured to communicate with the micro base station in the subframe in the second subframe set according to the second physical layer parameter configuration. The fourth receiving unit 38 is connected to the second communication unit 32, and is configured to provide the second physical layer parameter configuration to the second communication unit 32.

It should be noted herein that, in a specific implementation, the foregoing multiple receiving units may be implemented by using one receiver, and the present invention is not limited thereto.

The function units of the UE according to this embodiment may be configured to execute a corresponding procedure in the coordinated transmission method described from the perspective of the UE, and specific working principles of the function units are not described herein again. For details, see description of the method embodiment.

The UE of this embodiment separately communicates with a macro base station and a micro base station in a time division multiplexing manner, and a context of the UE is separately created on the macro base station and the micro base station, so that the macro base station and the micro base station do not need to share a context of the UE in real time, which lowers a requirement on a communication delay of a backhaul link between the macro base station and the micro base station. In this way, the macro base station and the micro base station are not required to be interconnected by means of optical fibers or high-speed microwaves. The coordinated transmission method according to this embodiment is no longer hindered by the manner in which the macro base station and the micro base station are interconnected, and can be applied to a wider application range, which takes full advantage of the coordinated transmission technology.

Figure 5:
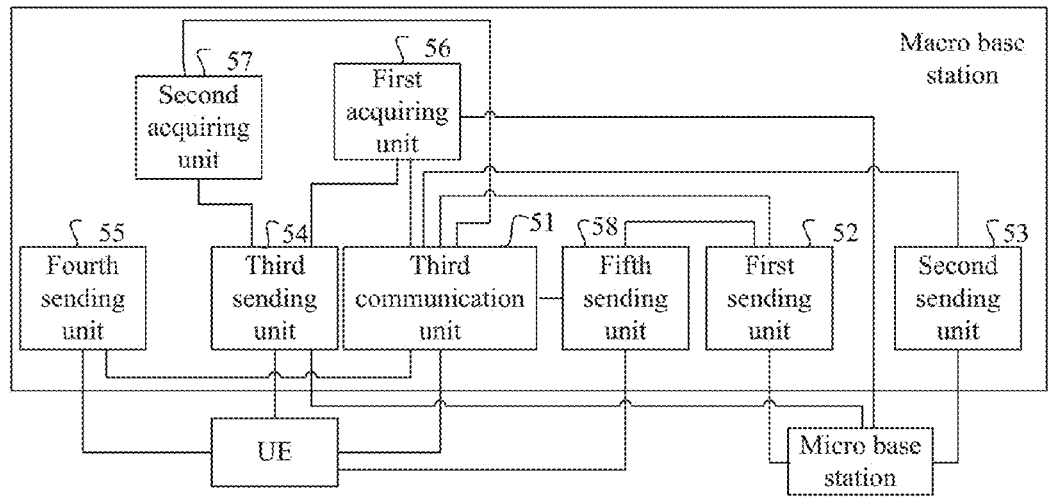
FIG. 5 is a schematic structural diagram of a macro base station according to an embodiment of the present invention.

FIG. 5 is a schematic structural diagram of a macro base station according to an embodiment of the present invention.

As shown in FIG. 5, the macro base station of this embodiment includes a third communication unit 51.

The third communication unit 51 is connected to a UE, and is configured to communicate with the UE in a subframe in a first subframe set, where the UE further communicates with a micro base station in a subframe in a second subframe set. In this embodiment, the subframe in the first subframe set and the subframe in the second subframe set do not overlap.

If a signaling connection of the UE is established on the macro base station of this embodiment, the macro base station of this embodiment may further include the following function units.

Optionally, the macro base station of this embodiment further includes: a first sending unit 52, where the first sending unit 52 is connected to the micro base station, and is configured to send the first subframe set and/or the second subframe set to the micro base station, so that the micro base station acquires the second subframe set. The first sending unit 52 may specifically determine the first subframe set and/or the second subframe set, and send the first subframe set and/or the second subframe set to the micro base station. In addition, the first sending unit 52 is further connected to the third communication unit 51, and is configured to provide the first subframe set to the third communication unit 51.

Optionally, the macro base station of this embodiment further includes: a second sending unit 53, where the second sending unit 53 is connected to the micro base station, and is configured to send a HARQ process identifier set that is used by the macro base station and corresponds to the UE and/or a HARQ process identifier set that is used by the micro base station and corresponds to the UE to the micro base station, so that the micro base station acquires the HARQ process identifier set that is used by the micro base station and corresponds to the UE. The second sending unit 53 may determine, by negotiating with the micro base station, the HARQ process identifier set that is used by the macro base station and corresponds to the UE and/or the HARQ process identifier set that is used by the micro base station and corresponds to the UE, and provides the HARQ process identifier set that is used by the macro base station and corresponds to the UE and/or the HARQ process identifier sets that is used by the micro base station and corresponds to the UE to the micro base station. In addition, the second sending unit 53 is further connected to the third communication unit 51, and is configured to provide the HARQ process identifier set that is used by the macro base station and corresponds to the UE to the third communication unit 51.

Optionally, the macro base station of this embodiment further includes: a third sending unit 54, where the third sending unit 54 is connected to the UE, and is configured to send a first physical layer parameter configuration and a second physical layer parameter configuration respectively corresponding to the first subframe set and the second subframe set to the UE. In this way, the UE may communicate with the macro base station and the micro base station in the subframe in the first subframe set and the second subframe set by using the first physical layer parameter configuration and the second physical layer parameter configuration respectively, which improves communication quality.

In an optional implementation, the macro base station of this embodiment further includes: a first acquiring unit 56, where the first acquiring unit 56 is configured to, before the third sending unit 54 sends the first physical layer parameter configuration and the second physical layer parameter configuration to the UE, determine the first physical layer parameter configuration and receive the second physical layer parameter configuration sent by the micro base station, so as to acquire the first physical layer parameter configuration and the second physical layer parameter configuration in advance. The first acquiring unit 56 is connected to the micro base station and the third sending unit 54, and is configured to provide the first physical layer parameter configuration and the second physical layer parameter configuration to the third sending unit 54. The first acquiring unit 56 is further connected to the third communication unit 51.

In an optional implementation, the macro base station of this embodiment further includes: a second acquiring unit 57, where the second acquiring unit 57 is configured to, before the third sending unit 54 sends the first physical layer parameter configuration and the second physical layer parameter configuration to the UE, separately determine the first physical layer parameter configuration and the second physical layer parameter configuration. The second acquiring unit 57 is connected to the third sending unit 54, and is configured to provide the first physical layer parameter configuration and the second physical layer parameter configuration to the third sending unit 54. The second acquiring unit 57 is further connected to the third communication unit 51.

Optionally, the third sending unit 54 is further configured to send the second physical layer parameter configuration acquired by the second acquiring unit 57 to the micro base station.

Optionally, the macro base station of this embodiment further includes a fourth sending unit 55, where the fourth sending unit 55 is connected to the UE, and is configured to send a first association relationship to the UE, where the first association relationship includes an identifier of a logical channel associated with the first subframe set. Based on this, the third communication unit 51 is specifically configured to receive, in an uplink subframe in the first subframe set, data, sent by the UE, on an RB corresponding to the identifier of the logical channel in the first association relationship. The macro base station of this embodiment configures the first association relationship for the UE by using the fourth sending unit 55, so that the UE sends, in the uplink subframe in the first subframe set, data on the RB corresponding to the identifier of the logical channel in the first association relationship to the macro base station, which allows data on one or some RBs of the UE to be transmitted only between the UE and one transmit source (that is, the macro base station). The fourth sending unit 55 is further connected to the third communication unit 51.

In an optional implementation, the fourth sending unit 55 is further configured to send a second association relationship to the UE, where the second association relationship includes an identifier of a logical channel associated with the second subframe set, so that the UE sends, in the uplink subframe in the second subframe set, data on an RB corresponding to the identifier of the logical channel in the second association relationship to the micro base station. The macro base station of this embodiment configures the second association relationship for the UE by using the fourth sending unit 55, so that the UE sends, in the uplink subframe in the second subframe set, data on the RB corresponding to the identifier of the logical channel in the second association relationship to the micro base station, which allows data on one or some RBs of the UE to be transmitted only between the UE and one transmit source (that is, the micro base station).

In an optional implementation, the macro base station of this embodiment further includes: a fifth sending unit 58, where the fifth sending unit 58 is configured to send, before the third communication unit 51 communicates with the UE in the subframe in the first subframe set, a configuration of the first subframe set and/or a configuration of the second subframe set to the UE, so that the UE distinguishes between the first subframe set and the second subframe set. The fifth sending unit 58 is further connected to the first sending unit 52 and the third communication unit 51.

In an optional implementation, the third communication unit 51 is specifically configured to communicate in the downlink with the UE in the downlink subframe in the first subframe set.

That the third communication unit 51 is specifically configured to communicate in the downlink with the UE in the downlink subframe in the first subframe set includes that: the third communication unit 51 is specifically configured to execute any one of the following operations or a combination thereof:

the third communication unit 51 is specifically configured to send, in the downlink subframe in the first subframe set, a CRS and a channel demodulated based on the CRS to the UE;

the third communication unit 51 is specifically configured to send, in the downlink subframe in the first subframe set, a PSS to the UE;

the third communication unit 51 is specifically configured to send, in the downlink subframe in the first subframe set, an SSS to the UE; and the third communication unit 51 is specifically configured to send, in the downlink subframe in the first subframe set, an ePDCCH demodulated based on a DMRS to the UE.

In an optional implementation, the third communication unit 51 is specifically configured to communicate in the uplink with the UE in an uplink subframe in the first subframe set.

The function units of the macro base station of this embodiment may be configured to execute a corresponding procedure of the coordinated transmission method described from the perspective of a macro base station, and specific working principles of the function units are not described herein again. For details, see description of the method embodiment.

The macro base station according to this embodiment supports a UE to separately communicate with the macro base station and a micro base station in a time division multiplexing manner, and the macro base station communicates with the UE in a subframe in a first subframe set, so that the macro base station and the micro base station do not need to share a context of the UE in real time, which lowers a requirement on a communication delay on an air interface side. In this way, there is no longer a limitation imposed on an interconnection manner between the macro base station and the micro base station, thereby extending application scenarios and scopes of the coordinated transmission technology. In addition, the macro base station of this embodiment may further solve a plurality of problems that may be confronted during a coordinated transmission procedure. For example, data on a same RB of the UE is transmitted only between the UE and one transmit source, which ensures data transmission accuracy. For another example, different physical layer parameter configurations are provided for different subframe sets, which improves communication quality. For still another example, the macro base station of this embodiment, by exchanging, with the micro base station, different signals or channels with the UE, which not only implements coordinated transmission but also improves communication efficiency.

Figure 6:
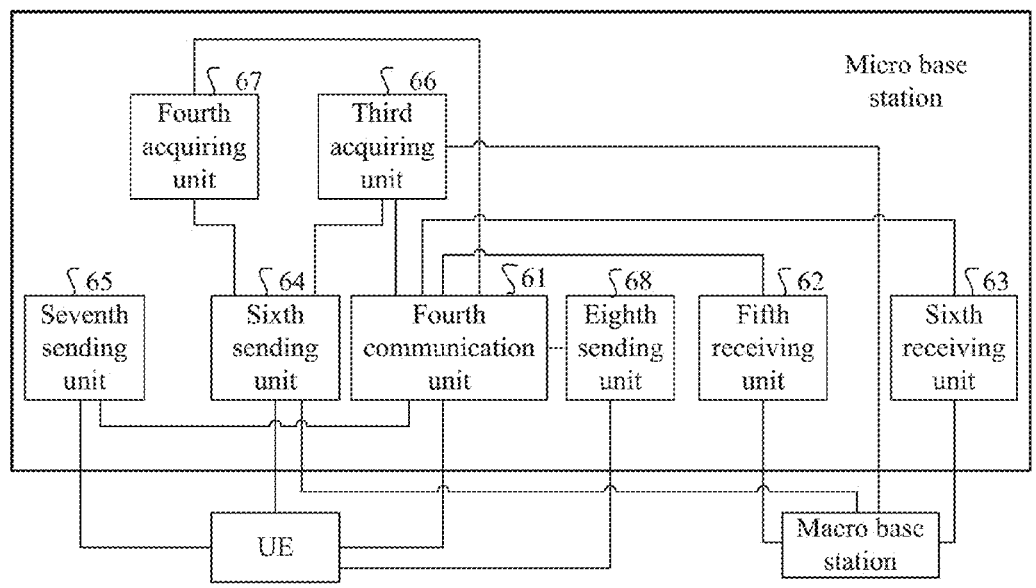
FIG. 6 is a schematic structural diagram of a micro base station according to an embodiment of the present invention.

FIG. 6 is a schematic structural diagram of a micro base station according to an embodiment of the present invention. As shown in FIG. 6, the micro base station of this embodiment includes a fourth communication unit 61.

The fourth communication unit 61 is connected to a UE, and is configured to communicate with the UE in a subframe in a second subframe set, where the UE further communicates with a macro base station in the subframe in the first subframe set. In this embodiment, the subframe in the first subframe set and the subframe in the second subframe set do not overlap.

Optionally, the micro base station of this embodiment further includes: a fifth receiving unit 62, where the fifth receiving unit 62 is connected to the macro base station, and is configured to receive the first subframe set and/or the second subframe set sent by the macro base station, so as to acquire the second subframe set. The fifth receiving unit 62 is connected to the fourth communication unit 61, and is configured to provide the second subframe set to the fourth communication unit 61.

Optionally, the micro base station of this embodiment further includes: a sixth receiving unit 63, where the sixth receiving unit 63 is connected to the macro base station, and is configured to receive, from the macro base station, a HARQ process identifier set that is used by the macro base station and corresponds to the UE and/or a HARQ process identifier set that is used by the micro base station and corresponds to the UE, so as to acquire the HARQ process identifier set that is used by the micro base station and corresponds to the UE. The sixth receiving unit 63 is connected to the fourth communication unit 61, and is configured to provide the HARQ process identifier set that is used by the micro base station and corresponds to the UE to the fourth communication unit 61.

If a signaling connection of the UE is established on the micro base station of this embodiment, the micro base station of this embodiment may further include the following function units.

Optionally, the micro base station of this embodiment further includes: a sixth sending unit 64, where the sixth sending unit 64 is connected to the UE, and is configured to send a first physical layer parameter configuration and a second physical layer parameter configuration respectively corresponding to the first subframe set and the second subframe set to the UE. The micro base station of this embodiment may provide different physical layer parameter configurations for different subframe sets of the UE by using the sixth sending unit 64. In this way, the UE may use corresponding physical layer parameter configurations to perform air interface transmission in subframes in different subframe subsets, which is favorable for adapting to different channel conditions and is favorable for improving transmission quality.

In an optional implementation, the micro base station of this embodiment further includes: a third acquiring unit 66, where the third acquiring unit 66 is configured to, before the sixth sending unit 64 sends the first physical layer parameter configuration and the second physical layer parameter configuration to the UE, determine the second physical layer parameter configuration, and receive the first physical layer parameter configuration sent by the macro base station. The third acquiring unit 66 is connected to the macro base station and the sixth sending unit 64, and is configured to provide the first physical layer parameter configuration and the second physical layer parameter configuration to the sixth sending unit 64. The third acquiring unit 66 is further connected to the fourth communication unit 61.

In an optional implementation, the micro base station of this embodiment further includes: a fourth acquiring unit 67, where the fourth acquiring unit 67 is configured to, before the sixth sending unit 64 sends the first physical layer parameter configuration and the second physical layer parameter configuration to the UE, separately determine the first physical layer parameter configuration and the second physical layer parameter configuration. The fourth acquiring unit 67 is connected to the sixth sending unit 64, and is configured to provide the first physical layer parameter configuration and the second physical layer parameter configuration to the sixth sending unit 64. The fourth acquiring unit 67 is further connected to the fourth communication unit 61.

Optionally, the sixth sending unit 64 is further connected to the macro base station, and is further configured to send the first physical layer parameter configuration determined by the fourth acquiring unit 67 to the macro base station.

Optionally, the micro base station of this embodiment further includes: a seventh sending unit 65, where the seventh sending unit 65 is connected to the UE, and is configured to send a second association relationship to the UE, where the second association relationship includes an identifier of a logical channel associated with the second subframe set. Based on this, the fourth communication unit 61 is specifically configured to receive, in an uplink subframe in the second subframe set, data, sent by the UE, on an RB corresponding to the identifier of the logical channel in the second association relationship. The micro base station of this embodiment configures the second association relationship for the UE by using the seventh sending unit 65, so that the UE sends, in the uplink subframe in the second subframe set, the data on the RB corresponding to the identifier of the logical channel in the second association relationship to the micro base station, which allows data on one or some RBs of the UE to be transmitted only between the UE and one transmit source (that is, the micro base station). The seventh sending unit 65 is further connected to the fourth communication unit 61.

In an optional implementation, the seventh sending unit 65 is further configured to send a first association relationship to the UE, where the first association relationship includes an identifier of a logical channel associated with the first subframe set, so that the UE sends, in the uplink subframe in the first subframe set, data on an RB corresponding to the identifier of the logical channel in the first association relationship to the macro base station. The micro base station of this embodiment configures the first association relationship for the UE by using the seventh sending unit 65, so that the UE sends, in the uplink subframe in the first subframe set, the data on the RB corresponding to the identifier of the logical channel in the first association relationship to the macro base station, which allows data on one or some RBs of the UE to be transmitted only between the UE and one transmit source (that is, the macro base station).

In an optional implementation, the micro base station of this embodiment further includes: an eighth sending unit 68, where the eighth sending unit 68 is connected to the UE, and is configured to send, before the fourth communication unit 61 communicates with the UE in the subframe in the second subframe set, a configuration of the first subframe set and/or a configuration of the second subframe set to the UE, so that the UE distinguishes between the first subframe set and the second subframe set. The eighth sending unit 68 is connected to the fourth communication unit 61.

In an optional implementation, the fourth communication unit 61 is specifically configured to communicate in the downlink with the UE in a downlink subframe in the second subframe set.

That the fourth communication unit 61 is specifically configured to communicate in the downlink with the UE in a downlink subframe in the second subframe set includes that: the fourth communication unit 61 is specifically configured to execute any one of the following operations or a combination thereof:

the fourth communication unit 61 is specifically configured to send a CSI-RS to the UE in the downlink subframe in the second subframe set; and the fourth communication unit 61 is specifically configured to send a DMRS and a channel demodulated based on the DMRS to the UE in the downlink subframe in the second subframe set.

In an optional implementation, the fourth communication unit 61 is specifically configured to communicate in the uplink with the UE in an uplink subframe in the second subframe set.

The function units of the micro base station of this embodiment may be configured to execute a corresponding procedure of the coordinated transmission method described from the perspective of the micro base station, and specific working principles of the function units are not described herein again. For details, see description of the method embodiment.

The micro base station according to this embodiment supports a UE to separately communicate with a macro base station and the micro base station in a time division multiplexing manner, and the micro base station communicates with the UE in a subframe in a second subframe set, so that the macro base station and the micro base station do not need to share a context of the UE in real time, which lowers a requirement on a communication delay on an air interface side. In this way, there is no longer a limitation imposed on an interconnection manner between the macro base station and the micro base station, thereby extending application scenarios and scopes of the coordinated transmission technology. In addition, the micro base station of this embodiment may further solve a plurality of problems that may be confronted during a coordinated transmission procedure. For example, data on a same RB of the UE is transmitted only between the UE and one transmit source, which ensures data transmission accuracy. For another example, different physical layer parameter configurations are provided for different subframe sets, which improves communication quality. For still another example, the micro base station of this embodiment, by exchanging, with a macro base station, different signals or channels with the UE, not only implements coordinated transmission but also improves communication efficiency.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended to describe the technical solutions of the present invention, and not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A coordinated transmission method, comprising:
communicating, by a user equipment (UE), with a macro base station in a subframe in a first subframe set; and
communicating, by the UE, with a micro base station in a subframe in a second subframe set; wherein the subframe in the first subframe set and the subframe in the second subframe set do not overlap;
wherein before the communicating, by the UE, with the macro base station in the subframe in the first subframe set, the method further comprises:
receiving, by the UE, a first association relationship and a second association relationship sent by the macro base station, wherein the first association relationship comprises an identifier of a first logical channel associated with the first subframe set, the second association relationship comprises an identifier of a second logical channel associated with the second subframe set; and wherein
the communicating, by the UE, with the macro base station in the subframe in the first subframe set comprises:
sending, by the UE in a first uplink subframe in the first subframe set according to the first association relationship, data on a first radio bearer corresponding to the identifier of the first logical channel in the first association relationship to the macro base station, the first logical channel having a one-to-one correspondence with the first radio bearer;
the communicating, by the UE, with a micro base station in a subframe in a second subframe set comprises:
sending, by the UE in a second uplink subframe in the second subframe set according to the second association relationship, data on a second radio bearer corresponding to the identifier of the second logical channel in the second association relationship to the micro base station, the second logical channel having a one-to-one correspondence with the second radio bearer.

2. The coordinated transmission method according to claim 1, wherein before the communicating, by the UE, with the macro base station in the subframe in the first subframe set, the method further comprises:
determining, by the UE, a downlink subframe in the first subframe set, wherein the downlink subframe in the first subframe set meet that, if a downlink subframe n belongs to the first subframe set, a downlink subframe (n+8) also belongs to the first subframe set.

3. The coordinated transmission method according to claim 2, wherein before the communicating, by the UE, with the macro base station in the subframe in the first subframe set, the method further comprises:
determining, by the UE, an uplink subframe in the first subframe set, wherein the uplink subframe in the first subframe set meet that, if the downlink subframe n belongs to the first subframe set, an uplink subframe (n+4) belongs to the first subframe set.

4. The coordinated transmission method according to claim 1, wherein before the communicating, by the UE, with the micro base station in the subframe in the second subframe set, the method further comprises:
determining, by the UE, a downlink subframe in the second subframe set, wherein the downlink subframe in the second subframe set meet that, if a downlink subframe m belongs to the second subframe set, a downlink subframe (m+8) also belongs to the second subframe set.

5. The coordinated transmission method according to claim 4, wherein before the communicating, by the UE, with the micro base station in the subframe in the second subframe set, the method further comprises:
determining, by the UE, an uplink subframe in the second subframe set, wherein the uplink subframe in the second subframe set meet that, if the downlink subframe m belongs to the second subframe set, an uplink subframe (m+4) belongs to the second subframe set.

6. The coordinated transmission method according to claim 1, wherein the communicating, by the UE, with the macro base station in the subframe in the first subframe set comprises any one of the following operations or a combination thereof:
receiving, by the UE in a downlink subframe in the first subframe set, a cell-specific reference signal (CRS) and a channel demodulated based on the CRS that are sent by the macro base station;
receiving, by the UE in the downlink subframe in the first subframe set, a primary synchronization signal (PSS) sent by the macro base station; and
receiving, by the UE in the downlink subframe in the first subframe set, a secondary synchronization signal (SSS) sent by the macro base station; and receiving, by the UE in the downlink subframe in the first subframe set, an evolved physical downlink control channel (ePDCCH) that is demodulated based on a demodulation reference signals (DMRS) and sent by the macro base station.

7. The coordinated transmission method according to claim 1, wherein the communicating, by the UE, with the micro base station in the subframe in the second subframe set comprises any one of the following operations or a combination thereof:
receiving, by the UE in a downlink subframe in the second subframe set, a channel state information reference signal (CSI-RS) sent by the micro base station; and
receiving, by the UE in the downlink subframe in the second subframe set, a demodulation reference signals (DMRS) and a channel demodulated based on the DMRS that are sent by the micro base station.

8. A user equipment, comprising:
a first communication unit, configured to communicate with a macro base station in a subframe in a first subframe set; and
a second communication unit, configured to communicate with a micro base station in a subframe in a second subframe set; wherein the subframe in the first subframe set and the subframe in the second subframe set do not overlap;
wherein the user equipment further comprises:
a first receiving unit, configured to receive a first association relationship sent by the macro base station, wherein the first association relationship comprises an identifier of a first logical channel associated with the first subframe set; and wherein
the first communication unit is specifically configured to send, in a first uplink subframe in the first subframe set according to the first association relationship received by first receiving unit, data on a first radio bearer corresponding to the first logical channel in the first association relationship to the macro base station, the first logical channel having a one-to-one correspondence with the first radio bearer;

a second receiving unit, configured to receive a second association relationship sent by the macro base station, wherein the second association relationship comprises an identifier of a second logical channel associated with the second subframe set; and wherein the second communication unit is specifically configured to send, in a second uplink subframe in the second subframe set according to the second association relationship received by second receiving unit, data on a second radio bearer corresponding to the second logical channel in the second association relationship to the micro base station, the second logical channel having a one-to-one correspondence with the second radio bearer.

9. The user equipment according to claim 8, further comprising:

a first determining unit, configured to determine a downlink subframe in the first subframe set, wherein the downlink subframe in the first subframe set meet that, if a downlink subframe n belongs to the first subframe set, a downlink subframe (n+8) also belongs to the first subframe set.

10. The user equipment according to claim 9, wherein the first determining unit is further configured to determine an uplink subframe in the first subframe set, wherein the uplink subframe in the first subframe set meet that, if the downlink subframe n belongs to the first subframe set, an uplink subframe (n+4) belongs to the first subframe set.

11. The user equipment according to claim 8, further comprising:

a second determining unit, configured to determine a downlink subframe in the second subframe set, wherein the downlink subframe in the second subframe set meet that, if a downlink subframe m belongs to the second subframe set, a downlink subframe (m+8) also belongs to the second subframe set.

12. The user equipment according to claim 11, wherein the second determining unit is further configured to determine an uplink subframe in the second subframe set, wherein the uplink subframe in the second subframe set meet that, if the downlink subframe m belongs to the second subframe set, an uplink subframe (m+4) belongs to the second subframe set.

13. The user equipment according to claim 8, wherein the first communication unit is specifically configured to execute any one of the following operations or a combination thereof:

receiving, in the downlink subframe in the first subframe set, a cell-specific reference signal (CRS) and a channel demodulated based on the CRS that are sent by the macro base station;

receiving, in the downlink subframe in the first subframe set, a primary synchronization signal (PSS) sent by the macro base station;

receiving, in the downlink subframe in the first subframe set, a secondary synchronization signal (SSS) sent by the macro base station; and receiving, in the downlink subframe in the first subframe set, an evolved physical downlink control channel (ePDCCH) that is demodulated based on a demodulation reference signals (DMRS) and sent by the macro base station.

14. The user equipment according to claim 8, wherein the second communication unit is specifically configured to execute any one of the following operations or a combination thereof:

receiving, in a downlink subframe in the second subframe set, a channel state information reference signal (CSI-RS) sent by the micro base station; and receiving, in the downlink subframe in the second subframe set, a demodulation reference signals DMRS and a channel demodulated based on the DMRS that are sent by the micro base station.

15. The user equipment according to claim 8, further comprising:

a third receiving unit, configured to receive a configuration of the first subframe set and/or a configuration of the second subframe set sent by the macro base station or the micro base station, so as to distinguish between the first subframe set and the second subframe set.

16. The user equipment according to claim 8, further comprising:

a fourth receiving unit, configured to receive a first physical layer parameter configuration sent by the macro base station or the micro base station, wherein the first communication unit is specifically configured to communicate with the macro base station in the subframe in the first subframe set according to the first physical layer parameter configuration.

17. The user equipment according to claim 16, wherein the fourth receiving unit is further configured to receive a second physical layer parameter configuration sent by the macro base station or the micro base station; and the second communication unit is specifically configured to communicate with the micro base station in the subframe in the second subframe set according to the second physical layer parameter configuration.

* * * * *